(12) United States Patent
Malik

(10) Patent No.: US 9,736,165 B2
(45) Date of Patent: Aug. 15, 2017

(54) CENTRALIZED AUTHENTICATION FOR GRANTING ACCESS TO ONLINE SERVICES

(71) Applicant: AT&T Intellectual Property I, L.P., Atlanta, GA (US)

(72) Inventor: Dale W. Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 139 days.

(21) Appl. No.: 14/726,117

(22) Filed: May 29, 2015

(65) Prior Publication Data

US 2016/0352729 A1    Dec. 1, 2016

(51) Int. Cl.
*H04L 29/06* (2006.01)
*H04W 4/02* (2009.01)
(Continued)

(52) U.S. Cl.
CPC ............ *H04L 63/102* (2013.01); *H04L 63/08* (2013.01); *H04L 63/107* (2013.01); *H04W 4/02* (2013.01); *H04W 12/06* (2013.01); *H04W 12/08* (2013.01)

(58) Field of Classification Search
None
See application file for complete search history.

(56) References Cited

U.S. PATENT DOCUMENTS 7,383,333 B2    6/2008  Philyaw et al.
7,401,235 B2 *  7/2008  Mowers ................. G06F 21/31
                                                        709/203

(Continued)

FOREIGN PATENT DOCUMENTS

CN    103856942      6/2014
WO    2007104245     9/2007
WO    2013056619     4/2013

OTHER PUBLICATIONS

CA Technologies, "CA Advanced Authentication—Combines multi-factor credentials and risk evaluation to help avoid inappropriate access and fraud," CA® technologies, ca.com <http://www.ca.com/us/securecenter/ca-advanced-authentication.aspx>, Jan. 2015 (4 pages).

(Continued)

*Primary Examiner* — Peter Poltorak
(74) *Attorney, Agent, or Firm* — Hanley, Flight & Zimmerman, LLC

(57) ABSTRACT

Methods, apparatus, systems and articles of manufacture (e.g., physical storage media) to implement centralized authentication for granting access to online services are disclosed. Example authentication methods disclosed herein include accessing an identification code included in an authentication request received from an online service for authentication information associated with a first device, wherein the identification code was previously assigned to provide valid identification of the first device during a first time interval. Disclosed example authentication methods also include, in response to determining a profile selected based on the identification code permits the online service to access the authentication information, evaluating activity information associated with the first device based on the profile to determine the authentication information. Disclosed example authentication methods further include transmitting the authentication information to the online service.

17 Claims, 18 Drawing Sheets

(51) Int. Cl.
*H04W 12/06* (2009.01)
*H04W 12/08* (2009.01)

(56) References Cited

U.S. PATENT DOCUMENTS

| | | | |
|---|---|---|---|
| 7,620,978 B1 | 11/2009 | Reddy et al. | |
| 8,001,582 B2* | 8/2011 | Hulten | H04L 63/102 |
| | | | 726/3 |
| 8,473,429 B2 | 6/2013 | Cheng et al. | |
| 8,572,391 B2 | 10/2013 | Golan et al. | |
| 8,572,717 B2* | 10/2013 | Narayanaswamy | H04L 63/0245 |
| | | | 726/12 |
| 8,683,565 B2 | 3/2014 | Backlund | |
| 8,700,902 B2 | 4/2014 | Novack et al. | |
| 8,793,779 B2 | 7/2014 | Ferchichi et al. | |
| 8,800,029 B2* | 8/2014 | Horn | G06Q 10/10 |
| | | | 726/3 |
| 8,805,881 B2* | 8/2014 | Hom | G06F 21/552 |
| | | | 707/783 |
| 8,819,444 B2 | 8/2014 | Shahbazi et al. | |
| 9,367,706 B2* | 6/2016 | Loveland | G06Q 10/10 |
| 2003/0149781 A1* | 8/2003 | Yared | G06F 21/41 |
| | | | 709/229 |
| 2004/0199770 A1* | 10/2004 | Roskind | G06F 21/316 |
| | | | 713/176 |
| 2004/0249961 A1* | 12/2004 | Katsube | H04L 63/08 |
| | | | 709/229 |
| 2005/0097320 A1* | 5/2005 | Golan | G06F 21/40 |
| | | | 713/166 |
| 2005/0201363 A1* | 9/2005 | Gilchrist | H04L 51/12 |
| | | | 370/352 |
| 2005/0235341 A1* | 10/2005 | Stieglitz | G06F 21/46 |
| | | | 726/5 |
| 2006/0117175 A1* | 6/2006 | Miura | G06F 21/445 |
| | | | 713/155 |
| 2006/0179113 A1* | 8/2006 | Buckingham | H04L 63/08 |
| | | | 709/206 |
| 2006/0212407 A1* | 9/2006 | Lyon | G06Q 20/04 |
| | | | 705/71 |
| 2006/0212925 A1* | 9/2006 | Shull | G06F 21/55 |
| | | | 726/1 |
| 2006/0277259 A1* | 12/2006 | Murphy | H04L 51/12 |
| | | | 709/206 |
| 2007/0162349 A1* | 7/2007 | Silver | G06F 17/30864 |
| | | | 705/27.1 |
| 2008/0031214 A1* | 2/2008 | Grayson | H04W 88/10 |
| | | | 370/342 |
| 2008/0082646 A1* | 4/2008 | Shenfield | H04L 67/04 |
| | | | 709/223 |
| 2008/0084872 A1* | 4/2008 | Li | H04L 12/66 |
| | | | 370/352 |
| 2008/0141366 A1* | 6/2008 | Cross | G06F 21/6218 |
| | | | 726/21 |
| 2009/0300720 A1* | 12/2009 | Guo | G06Q 10/107 |
| | | | 726/3 |
| 2011/0167440 A1* | 7/2011 | Greenfield | H04L 63/102 |
| | | | 725/25 |
| 2011/0296519 A1* | 12/2011 | Ide | G06F 21/30 |
| | | | 726/13 |
| 2012/0030083 A1* | 2/2012 | Newman | G06Q 40/00 |
| | | | 705/35 |
| 2012/0191545 A1 | 7/2012 | Leibu et al. | |
| 2012/0233665 A1* | 9/2012 | Ranganathan | G06F 21/33 |
| | | | 726/4 |
| 2013/0054433 A1 | 2/2013 | Giard et al. | |
| 2013/0061055 A1 | 3/2013 | Schibuk | |
| 2013/0191884 A1* | 7/2013 | Leicher | H04L 63/08 |
| | | | 726/4 |
| 2013/0205380 A1 | 8/2013 | Avni et al. | |
| 2013/0318346 A1* | 11/2013 | Libonate | H04L 43/16 |
| | | | 713/168 |
| 2014/0068266 A1* | 3/2014 | Cismas | H04L 9/321 |
| | | | 713/171 |
| 2014/0189851 A1 | 7/2014 | Domke et al. | |
| 2014/0201100 A1* | 7/2014 | Rellas | G06Q 10/08 |
| | | | 705/330 |
| 2014/0223532 A1 | 8/2014 | Satoh et al. | |
| 2014/0245004 A1* | 8/2014 | Houston | H04L 63/20 |
| | | | 713/168 |
| 2014/0304157 A1 | 10/2014 | Bachenheimer et al. | |
| 2014/0308925 A1 | 10/2014 | Suh | |
| 2014/0310788 A1 | 10/2014 | Ricci | |
| 2014/0355592 A1* | 12/2014 | Camps | H04W 4/023 |
| | | | 370/338 |
| 2014/0373104 A1* | 12/2014 | Gaddam | H04L 63/105 |
| | | | 726/4 |
| 2014/0380445 A1 | 12/2014 | Tunnell et al. | |
| 2015/0059003 A1 | 2/2015 | Bouse | |
| 2015/0074259 A1 | 3/2015 | Ansari et al. | |
| 2015/0089568 A1* | 3/2015 | Sprague | H04L 63/0876 |
| | | | 726/1 |
| 2015/0089616 A1 | 3/2015 | Brezinski et al. | |
| 2016/0165036 A1* | 6/2016 | Leow | H04M 1/72527 |
| | | | 455/557 |
| 2016/0212140 A1* | 7/2016 | Sauma Vargas | H04W 12/06 |
| 2016/0294920 A1* | 10/2016 | Besprosvan | H04L 67/10 |

OTHER PUBLICATIONS

Portal Guard, "Portal Guard's Contextual Authentication", <http://www.portalguard.com/contextual-authentication.html>, 2009-2014 (2 pages).

McAfee Works, "McAfee Enterprise Authentication", <http://www.mcafeeworks.com/Enterprise-Authentication.asp>, 2000-2015 (2 pages).

Graham, Keith, "Moving Beyond 2-Factor Authentication with "Context"", <http://www.darkreading.com/endpoint/authentication/moving-beyond-2-factorauthentication-with-context/a/d-id/1317911>, Dec. 2014 (13 pages).

Wikipedia, "Query string", Wikipedia.com, last modified on Apr. 15, 2015 (6 pages).

Berners-Lee, et al., "Uniform Resource Identifier (URI): Generic Syntax", Jan. 2005 (61 pages).

* cited by examiner

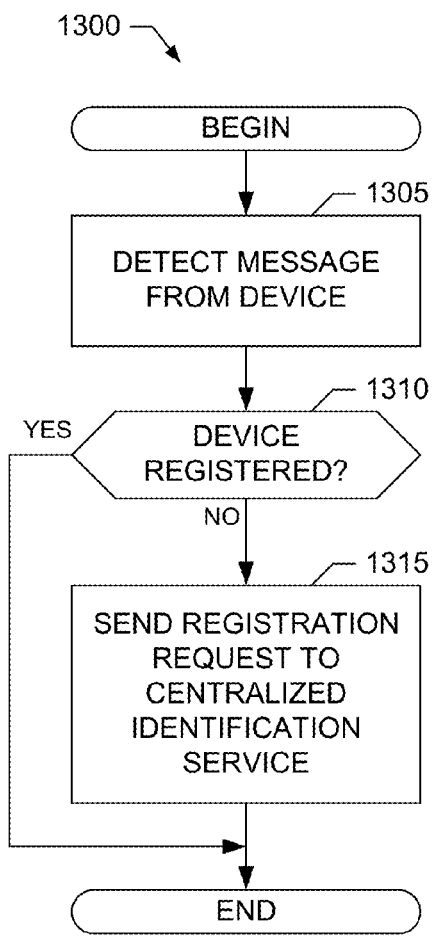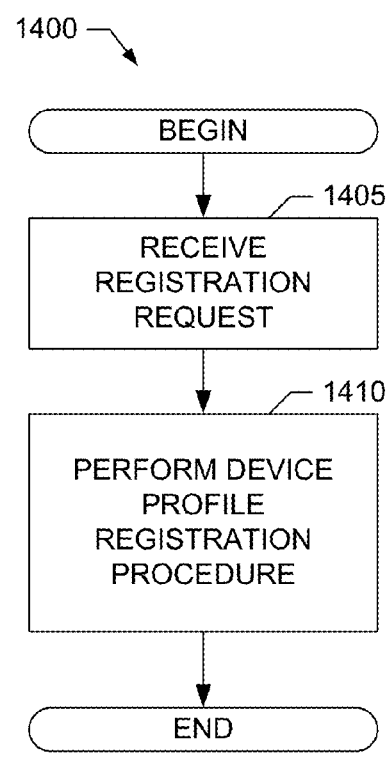
FIG. 13
FIG. 14

CENTRALIZED AUTHENTICATION FOR GRANTING ACCESS TO ONLINE SERVICES

FIELD OF THE DISCLOSURE

This disclosure relates generally to authentication of devices and device users and, more particularly, to providing centralized authentication for granting access to online services.

BACKGROUND

The use of online services, such as online banking, online shopping, online subscription-based services (e.g., media services, news services, and the like), etc., has become commonplace. To determine whether to grant access to users and/or devices, today's online services independently decide what type of authentication to employ, which is usually based on usernames and passwords. Such a piecemeal, independent approach to authentication can cause confusion for the end user, who may be required to remember a multitude of information to access a wide range of services. To simplify their online experience, some users reduce the amount of information to be remembered by using the same usernames and passwords across services, as well as by using simple passwords that can be hacked relatively easily. However, such user behavior can reduce the reliability and security of the authentication techniques currently employed by the online services.

BRIEF DESCRIPTION OF THE DRAWINGS

FIG. 13 is a flowchart representative of first example machine readable instructions that may be executed to implement the example network access point of FIGS. 1 and/or 4.

FIG. 14 is a flowchart representative of first example machine readable instructions that may be executed to implement the example centralized identification service of FIGS. 1 and/or 2.

Wherever possible, the same reference numbers will be used throughout the drawing(s) and accompanying written description to refer to the same or like parts, elements, etc.

DETAILED DESCRIPTION

Figure 1:
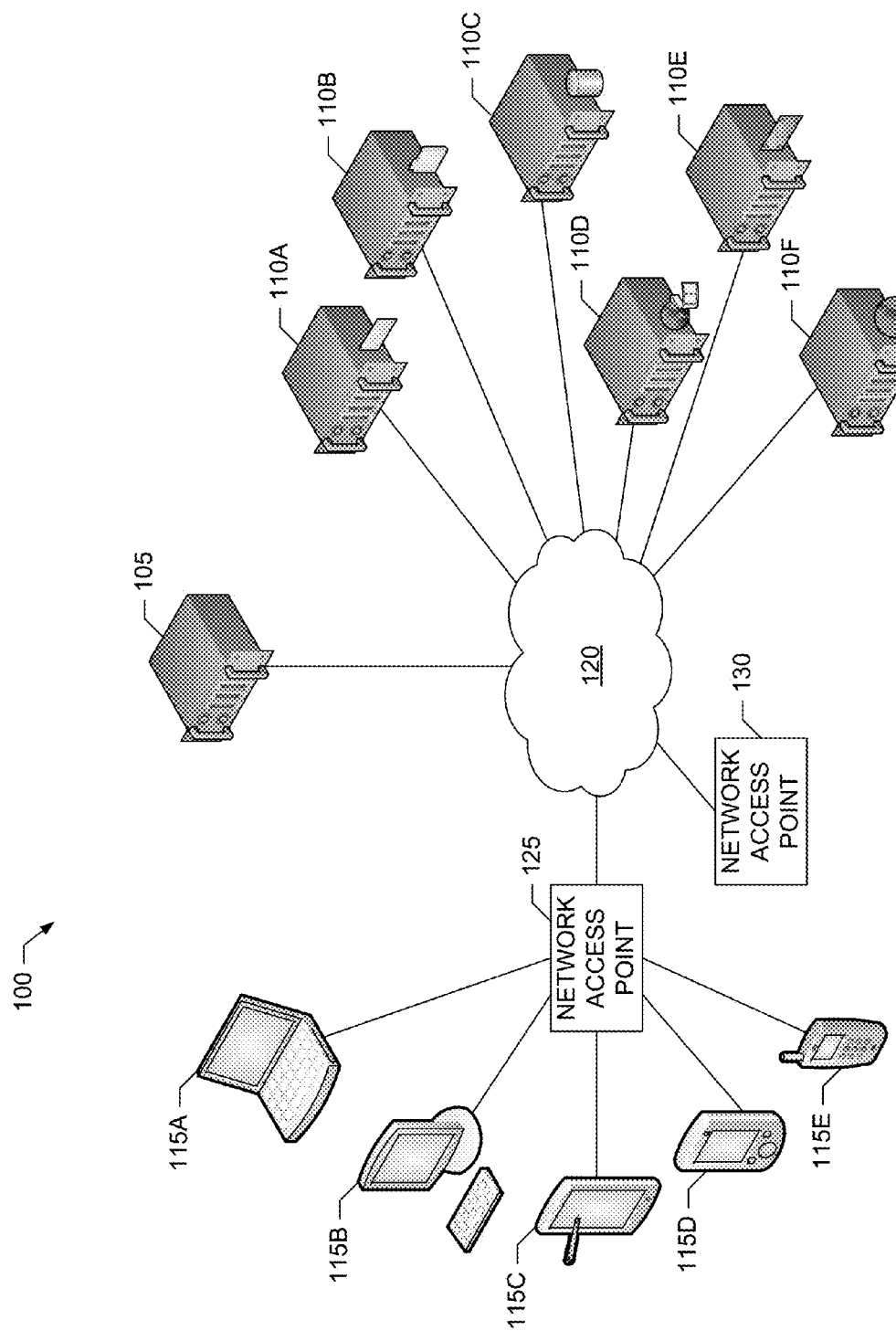
FIG. 1 is a block diagram of an example centralized authentication system supporting centralized authentication for granting access to online services in accordance with the teachings of this disclosure.

Methods, apparatus, systems and articles of manufacture (e.g., physical storage media) to implement centralized authentication for granting access to online services are disclosed herein. An example centralized authentication system disclosed herein includes a centralized identification service capable of identifying and providing authentication information for devices and/or device users in response to queries from, for example, online services the devices and/or device users are attempting to access. As disclosed in further detail below, the authentication information provided by the centralized identification service can be used in addition to, or instead of, existing online authentication techniques employed by the online services.

In some examples, the centralized identification service registers device profiles and maintains activity information related to device usage (e.g., such as information describing device location, network access points accessed, behavioral usage, etc.) at a centralized location (e.g., in a cloud database). As disclosed in further detail below, an online service can query the centralized identification service for authentication information related to a device requesting access to the online service. In some examples, an identification code is requested by a network access point (e.g., gateway) after intercepting an access request sent by the device to the online service, and the identification code is then included in the access request by the network access point when forwarding the access request to the online service. In some examples, the query from the online service to the centralized identification service includes this identification code previously assigned by the centralized identification service to the device, and which temporarily identifies the device. As disclosed in further detail below, in response to the query from the online service, the centralized identification service accesses a profile associated with the device (e.g., based on the identification code included in the query) and, if appropriate, determines authentication information for the device based on processing the profile and the activity information maintained for the device. The centralized identification service then transmits an authentication response (e.g., including the authentication information, if appropriate) to the online service. The online service then determines whether to grant access to the device based on the authentication response.

Examining the elements of a disclosed example centralized authentication system in further detail, example authentication methods performed by a disclosed example centralized identification service of the centralized authentication system include accessing an identification code included in an authentication request received from an online service for authentication information associated with a first device. In some examples, the identification code was previously assigned by the centralized identification service to provide valid identification of the first device temporarily (e.g., during a first time interval). Such disclosed example methods also include, in response to determining that a profile selected based on the identification code (e.g., and, thus, associated with the first device) permits the online service to access the authentication information, evaluating activity information associated with the first device based on the profile to determine the authentication information. Such disclosed example methods further include transmitting the authentication information to the online service.

In some such disclosed example methods, evaluating the activity information includes accessing mobility information specified for the first device in the profile and determining a location of the first device from the activity information. Some such disclosed example methods also include providing a first authentication status in the authentication information when the mobility information specifies that the first device is not mobile and the location of the first device corresponds to a location specified in the profile, but providing a second authentication status in the authentication information when the mobility information specifies that the first device is not mobile and the location of the first device does not correspond to the location specified in the profile. In some such disclosed example methods, the first authentication status indicates a higher level of authentication certainty (e.g., a higher level of trust) than the second authentication status. Additionally or alternatively, in some such disclosed example methods, the profile specifies that the first device is associated with a first user, and when the mobility information specifies that the first device is mobile, the methods further include determining, based on the location of the first device, whether the first device is co-located with a second device also associated with the first user (e.g., and, thus, also associated with the first device). Some such disclosed example methods then include providing the first authentication status in the authentication information when the mobility information specifies that the first device is mobile and the first device is determined to be co-located with the second device, but providing the second authentication status in the authentication information when the mobility information specifies that the first device is mobile and the first device is determined to not be co-located with the second device.

Additionally or alternatively, some such disclosed example methods further include, in response to determining the identification code is valid and a profile associated with the first device permits the online service to access the authentication information, sending an authentication prompt to the device. Some such disclosed example methods also include receiving an access code from the device in response to the authentication prompt, and evaluating the activity information associated with the first device and the access code based on the profile to determine the authentication information.

Additionally or alternatively, some such disclosed example methods further include receiving an identification code request from a gateway (or other network access point) providing network access to the first device prior to receiving the authentication request from the online service. In response to the identification code request, some such disclosed example methods include determining the identification code and transmitting the identification code to the gateway. Then, in response to the subsequent authentication request received from the online service, some such disclosed example methods include using the identification code to select the profile associated with the first device.

Additionally or alternatively, some such disclosed example methods further include receiving profile information associated with the first device from a gateway (or other network access point) providing network access to the first device. Some such disclosed example methods also include storing the profile information in the profile associated with the first device and, when authorized by the profile information, also storing billing information associated with a location of the gateway in the profile associated with the first device.

Additionally or alternatively, some such disclosed example methods further include, in response to determining the profile associated with the first device does not permit the online service to access the authentication information, sending an authentication response to the online service indicating the online service is not permitted to access the authentication information. Some such disclosed example methods include, after sending the authentication response, receiving a permission request from the online service requesting permission to access the authentication information. Some such disclosed example methods also include, in response to the permission request, sending a profile update request to the first device to obtain updated profile information specifying whether the online service is permitted to access the authentication information.

Example authentication methods performed by a disclosed example online service operating in the centralized authentication system include detecting whether an identification code is included in an access request received from a first device. Some such disclosed example methods also include, in response to detecting the identification code, transmitting an authentication request including the identification code to a centralized identification service to obtain authentication information associated with the first device. Some such disclosed example methods also include, after receiving the authentication information from the centralized identification service, determining whether to grant access to the first device based on the authentication information.

In some such disclosed example methods, the access request corresponds to a hypertext transfer protocol (HTTP) request, and the access code is appended to the HTTP request.

Additionally or alternatively, in some such disclosed example methods, determining whether to grant access to the first device includes determining whether to grant access to the first device based on the authentication information without prompting a user of the first device to provide username and password information.

Additionally or alternatively, in some such disclosed example methods, the authentication information is first authentication information, and determining whether to grant access to the first device includes performing an authentication procedure to obtain second authentication information from the first device. Some such disclosed example methods further include determining whether to grant access to the first device based on the first authentication information and the second authentication information.

Additionally or alternatively, in some such disclosed example methods, the authentication information includes an authentication status having at least one or a first value and a second value. For example, the first value may indicate a higher level of authentication certainty (e.g., a higher level of trust) for the first device than the second value. In some such disclosed examples, determining whether to grant access to the first device includes determining to grant access to the first device in response to the authentication status having the first value. Some such disclosed example methods also include determining to not grant access to the first device in response to the authentication status having the second first value. However, in some such disclosed example method, the authentication information is first authentication information, and the methods further include performing an authentication procedure to obtain second authentication information from the first device in response to the authentication status having the second first value. Some such disclosed example methods then include determining whether to grant access to the first device based on the first authentication information and the second authentication information.

Additionally or alternatively, some such disclosed example methods further include detecting a second identification code included in a second access request received from a second device, and transmitting a second authentication request including the second identification code to the centralized identification service to obtain second authentication information associated with the second device. Some such disclosed example methods also include receiving an authentication response from the centralized identification service indicating that access to the second authentication information is not permitted. Some such disclosed example methods further include sending a subsequent request to the centralized identification service to request permission to access the second authentication information.

Example authentication methods performed by a disclosed example gateway (or other network access point) operating in the centralized authentication system include intercepting an access request sent by a first device to an online service. Some such disclosed example methods also include modifying the access request to include an identification code obtained from a centralized identification service different from the online service. In some examples, the identification code is to provide valid identification of the first device temporarily (e.g., during a first time interval). Some such disclosed example methods further include forwarding the access request, after being modified to include the identification code, to the online service.

Some such disclosed example methods also include, in response to intercepting the access request, sending an identification code request including an identifier of the first device to the centralized identification service to request the identification code. In some examples, the identifier includes at least one of a network address (e.g., such as a medium access control (MAC) address, an Internet address, etc.) or an access number (e.g., such as a telephone number, a uniform resource identifier (URI), etc.) associated with the first device. Some such disclosed example methods further include obtaining the identifier of the first device from the access request.

Additionally or alternatively, some such disclosed example methods also include determining whether the first device has previously accessed the gateway and, in response to determining the first device has not previously accessed the gateway, initiating a registration procedure to obtain profile information associated with the first device. Some such disclosed example methods further include sending the profile information to the centralized identification service for storage in a device profile associated with the first device. In some such examples, the registration procedure includes at least one of the gateway or the centralized identification service sending data to the first device to cause the first device to present a registration interface via which the profile information may be entered by a user of the first device. In some examples, the profile information includes, but is not limited to, mobility information specified for the first device (e.g., such as whether the device is mobile, not mobile (e.g., fixed), etc.), a location associated with the device (e.g., such as whether the device is expected to be located at the same location associated with the gateway), sharing information specified for the device (e.g., such as whether the device is a personal device to be associated with one user or a shared device capable of being used by multiple users), billing authorization information (e.g., such as whether the device, or a user of the device, is authorized to make purchases), service authorization information (e.g., such as information specifying which service(s) is(are) permitted to request authentication information for the device from the centralized identification service). Additionally or alternatively, in some such examples, the registration procedure includes at least one of the gateway or the centralized identification service automatically updating the profile information to include, for example, a location of the gateway (e.g., to be associated with an expected location of the device), billing information (e.g., such as name, billing address, payment data (e.g., credit card data, banking data, etc.) for an authorized purchaser associated with the location of the gateway), etc.

These and other example methods, apparatus, systems and articles of manufacture (e.g., physical storage media) to implement centralized authentication for granting access to online services are disclosed in greater detail below.

As noted above, today's online services employ authentication techniques that are local to the online services. These local authentication techniques are typically based on usernames and passwords. Furthermore, these local authentication techniques typically operate independently from each other to determine whether to grant access to users and/or devices. For example, a first online service (e.g., a banking website) may employ an authentication technique based on a username and password meeting a first set of criteria (e.g., a minimum password length, a specified mix of alphabetic and numeric characters, and possibly at least one special (e.g., non-alphanumeric) character, etc.), whereas a second online service (e.g., a streaming media website) may employ a different authentication technique based on a username and password meeting a different second set of criteria.

As noted above, such a piecemeal, independent approach to authentication can cause confusion for end users due the amount of different authentication information (e.g., different usernames, different passwords, etc.) end users must remember to access the wide array of online services that are becoming a part of end users' everyday interactions. Thus, users tend to reduce the amount of authentication information to be remembered across different online services by, for example, using the same usernames and passwords across services, as well as by using simple passwords that can be hacked relatively easily, which can reduce the reliability and security of the authentication techniques currently employed by online services.

Prior authentication techniques based on cookies also have limitations. For example, security measures based on cookies are valid only so long as the cookies are refreshed and/or are not deleted by users. Furthermore, cookies typically do not cross over domains and/or web browser types. Thus, on devices utilizing multiple different web browsers, separate cookies may need to be maintained and refreshed for each different web browser.

Centralized authentication for granting access to online services, as disclosed herein, provides technical solutions to the foregoing technical problems associated with existing online authentication techniques by implementing a centralized identification service that provides authentication information in response to queries from, for example, different online services. Centralized authentication, as disclosed herein, can be used in addition to, or instead of, existing, local online authentication techniques employed by online services. Moreover, as disclosed in further detail below, centralized authentication implemented in accordance with the teachings of this disclosure is backward compatibility with online services not supporting centralized authentication.

As disclosed in further detail below, centralized authentication implemented in accordance with the teachings of this disclosure utilizes device profiles in combination with activity information (e.g., such as information describing device location, network access points accessed, behavioral usage, etc.), which is maintained by a centralized identification service, to determine authentication information for a device attempting to access an online service. For example, the centralized identification service may be implemented by a cloud service, and the authentication information may include a trusted identity of the device, a level of trust associated with that device/identity, etc. Accordingly, in some examples, an online service queries a centralized identification service implementing centralized authentication in accordance with the teachings of this disclosure to determine authentication information (e.g., a level of trust) associated with a device attempting to access the service (and, by inference, a level of trust associated with a user of the device), which the online service can then use to determine whether to grant access to the device. Furthermore, in some examples, a centralized identification service implementing centralized authentication in accordance with the teachings of this disclosure is able to provide context-based authentication information based on the activity of other devices linked or otherwise associated with the particular device undergoing authentication. These and other benefits of centralized authentication information are disclosed in further detail below.

Turning to the figures, a block diagram of an example centralized authentication system 100 implemented in accordance with the teachings of this disclosure is illustrated in FIG. 1. The example centralized authentication system 100 includes an example centralized identification service 105 to determine authentication information to be used by example online services 110A-F to determine whether to grant access to example devices 115A-E. In the illustrated example of FIG. 1, the online services 110A-F are accessible via an example network 120. Furthermore, in the illustrated example of FIG. 1, the devices 115A-E gain access to the network 120 via an example network access point 125. As such, the example centralized identification service 105, the example online services 110A-F and the example network access point 125 are in communication via the example network 120. Furthermore, the example devices 115A-E are in communication with the example online services 110A-F via the example network 120 and the example network access point 125.

As used herein, the phrase "in communication," including variants thereof, encompasses direct communication and/or indirect communication through one or more intermediary components or relays and does not require direct physical (e.g., wired) communication and/or constant communication, but rather additionally includes selective communication at periodic or aperiodic intervals, as well as one-time events.

The example devices 115A-E of FIG. 1 can include any number and/or type(s) of electronic devices, such as, but not limited to, an example portable computer 115A (e.g., such as a notebook computer, a laptop computer, etc.), an example desktop computer 115B, an example tablet 115C, an example smartphone 115D, an example mobile phone 115E, etc., and/or any combination(s) thereof. The example services 110A-F of FIG. 1 can include any number and/or type(s) of services, such as, but not limited to, an example email service 110A, an example file sharing service 110B, and example database service 110C, and example streaming media service 110D, an example banking service 110E, an example social media service 110F, etc., and/or any combination(s) thereof. In some examples, one or more of the services 110A-F are implemented by websites hosted by one or more servers and/or cloud services, which are accessible by one or more of the example devices 115A-E via a web browser or other general-purpose Internet client implemented by the devices 115A-E. Additionally or alternatively, in some examples, one or more of services 110A-F are implemented by applications (e.g., apps) resident on the devices 115A-E and configured to communicate with one or more servers and/or cloud services implementing the respective service(s) 110A-F. The example network 120 may be implemented by any number and/or type(s) of communication networks, such as one or more wired communication networks (e.g., broadband networks, public telephony networks, etc.), one or more wireless communication networks (e.g., mobile cellular networks, wireless local area networks, etc.), etc., and/or any combination thereof. The example network access point 125 may be implemented by any number and/or type(s) of communication network access points, such as one or more home gateways, mobile network gateways, routers, servers, etc.

The example centralized identification service 105 of FIG. 1 is implemented by one or more servers and/or cloud services to provide authentication information associated with the example devices 115A-E in response to queries from the online services 110A-F. For example, the centralized identification service 105 of the illustrated example maintains device profiles for the example devices 115A-E, which the centralized identification service 105 uses in combination with activity and/or other information obtained for the example devices 115A-E to determine authentication information for the devices 115A-E in response queries from the online services 110A-F. The authentication information returned by the centralized identification service 105 can include, but is not limited to, a trusted identify associated with a particular one of the devices 115A-E, a level of trust associated with the particular one of the devices 115A-E and/or the identity returned for that device, etc. In the illustrated example of FIG. 1, the authentication information returned by the centralized identification service 105 can be used in addition to, or instead of, existing, local online authentication techniques employed by one or more of the online services 110A-F.

For example, the centralized identification service 105 of FIG. 1 stores and maintains device profiles associated with devices 115A-E used by users to access one or more communication networks, such as the network 120, and provides authentication information to the online services 110A-F based on evaluating the device profiles. A device profile associated with a particular one of the devices 115A-E may store some or all of device usage characteristics, location information, authentication permission information, personal identification information, etc., associated with the corresponding device. In some examples, in response to an access request received from a device, such as the example device 115A, an online service, such as the example online service 110A, queries the centralized identification service 105 for authentication information to be used to determine whether to grant the device 115A (or a user of the device 115A) access to the online service 110A. In response to the query, the centralized identification service 105 retrieves (e.g., based on an identification code included in the query, as disclosed in further detail below) and evaluates the device profile associated with the device 115A (e.g., based on activity information that is also maintained for the device 115A in, for example, an activity log), and returns appropriate authentication information. The online service 110A can then use the returned authentication information to determine whether to grant or deny the device 115A access to the online service 110A, or to request further authentication information from the device 115A (and/or the user of the device 115A).

Some examples of the centralized authentication system 100 support creation of trusted domains using network access points, such as the example network access point 125, as a point for registering new devices, such as the devices 115A-E, with the centralized identification service 105, as well as for tracking usage of the devices 115A-E registered with the centralized identification service 105. For example, if the network access point 125 corresponds to an example home gateway 125, the home gateway 125 can act as a logical identity checkpoint for devices 115A-E in the home by capturing a network address (e.g., a MAC address, an Internet address, etc.) and/or other device identifier(s) (e.g., such as an electronic serial number (ESN), etc.) associated with a device, such as the device 115A, during a registration process when the device 115A first accesses the local network (e.g., WiFi network, local area network (LAN), etc.) implemented by the home gateway 125. During the registration process, the device user is prompted (e.g., via a registration screen presented by the device 115A), to provide device profile information to be stored in a profile associated with the device 115A based on the device identifier(s) obtained by the home gateway 125. Examples of the device profile information obtained via the registration procedure include, but are not limited to, mobility information specified for the device (e.g., such as whether the device is mobile, not mobile (e.g., fixed), etc.), a location associated with the device (e.g., such as whether the device is expected to be located at the same location associated with the gateway), sharing information specified for the device (e.g., such as whether the device is a personal device to be associated with one user or a shared device capable of being used by multiple users), billing authorization information (e.g., such as whether the device, or a user of the device, is authorized to make purchases), service authorization information (e.g., such as information specifying which service(s) is(are) permitted to request authentication information for the device from the centralized identification service). In some examples, if a device, such as the example device 115A, has mobile cellular capability, a network access point corresponding to a mobile network gateway of a mobile network, such as an example mobile network gateway 130 included in the example centralized authentication system 100, can additionally or alternatively act as a logical identity checkpoint via which the device 115A may be registered with the centralized identification service 105 and a device profile can be created. In some such examples, an access number (e.g., such as a telephone number, a URI, etc.) of the device 115A can be used as a device identifier for the device 115A (e.g., in addition to, or instead of, the MAC address and/or other device identifier(s) configured for storage in the device's profile).

In some examples, device profiles for devices associated with a given local network, such as the devices 115A-E associated with the local area network implemented by the home gateway 125, are maintained by the centralized identification service 105 in a cloud database along with the address for home gateway 125 (e.g., local router) used to connect the local network to a wide area network, such as the network 120 (e.g., the Internet). Additionally or alternatively, in some examples, the device profiles for the devices 115A-E associated with the given local network may be updated (e.g., automatically) with the name and address of the billing party for that location. Accordingly, in some examples, the centralized identification service 105 may store and maintain profiles associated with locations (e.g., home locations, local area network location, etc.) and/or specific users.

In some examples, to use the centralized identification service 105 to facilitate device/user authentication, when a device, such as the device 115A, requests access to an online service, such as the online service 110A, (e.g., by sending a request including the uniform resource locator (URL) for a website of the online service), the home gateway 125 (or mobile network gateway 130, if the device is accessing the online service 110A via a mobile network) intercepts the request and appends an authentication identification code to the request as a data field. For example, the home gateway 125 (or the mobile network gateway 130) may request the authentication identification code from the centralized identification service 105 by sending the device identifier(s) for the device 115A (e.g., obtained from the intercepted request) to the centralized identification service 105. In response, the centralized identification service 105 returns an authentication identification code, which in some examples is valid for a short duration, as an access key to be used by the online service 110A to request authentication information specific to the device 115A requesting access. For example, the online service 110A may include the authentication identification code, which was appended to the service access request by the home gateway 125 (or the mobile network gateway 130), in a query sent to the centralized identification service 105 to obtain authentication information for the device 115A. In response, the centralized identification service 105 maps the authentication identification code to the particular device 115A, evaluates the device profile for the device 115A against activity information (and/or other information) maintained for and/or otherwise associated with the device 115A, and returns authentication information for the device 115A to the online service 110A. In some examples, the online service 110A then uses the returned authentication information to determine whether to grant the device 115A access to the service 110A (e.g., without the need for a user of the device 115A to enter a username/password combination or any other authentication information).

In some examples, the authentication information returned by the centralized identification service 105 for a device, such as the device 115A, indicates whether the device 115A is being used in the location configured in the device's profile (e.g., which, if true, increases a level of trust associated with the device 115A because, for example, it is likely that the particular user registered with the centralized identification service 105 as being the user of the device 115A is actually the one using the device 115A). Additionally or alternatively, in some examples, the authentication information returned by the centralized identification service 105 indicates whether the device 115A is being used at a same location as one or more other devices, such as one or more of the devices 115B-E, also associated with the same user (e.g., which, if true, increases the likelihood that the registered user is using the device 115A and, thus, increases the level of trust associated with the device 115A). Additionally or alternatively, in some examples, the authentication information returned by the centralized identification service 105 includes identification information (e.g., user billing information) if, for example, the device profile for the device 115A has been configured to allow such information to be conveyed to an online service, such as the online service 110A. Additionally or alternatively, in some examples, the centralized identification service 105 may prompt the user of the device 115A for an access code (e.g., specified in the device profile), and then indicate in the returned authentication information whether a valid access code was provided by the device user.

In some examples, the centralized identification service 105 evaluates the device profile for a device, such as the device 115A, against activity information (e.g., maintained in an activity log) for the device 115A to return an authentication level, or trust level, for the device, which indicates a level of certainty that the registered device user is actually using the device 115A. For example, possible trust levels may be green, yellow and red corresponding, respectively, to high, intermediate and low levels of trust. In some such examples, the centralized identification service 105 may return a green (e.g., highest) trust level if, for example, the centralized identification service 105 determines that (1) the device 115A is being used at an expected location specified in the device's profile, (2) a valid access code was received and (3) a second device, such as one of the devices 115B-E, also associated with the user (e.g., the user's mobile phone) is also detected at the same location. In some such examples, the centralized identification service 105 may return a yellow (e.g., intermediate) trust level if, for example, the centralized identification service 105 determines that the device 115A is being used at the expected location specified in the device's profile, but no other authentication information is available (e.g., no access code is received, and no secondary devices are detected at the same location). In some such examples, the centralized identification service 105 may return a red (e.g., lowest) trust level if, for example, the centralized identification service 105 determines that the device 115A is not being used at the expected location specified in the device's profile, and no other authentication information is available (e.g., no access code is received, and no secondary devices are detected at the same location). In some examples, the centralized identification service 105 may return a yellow (e.g., intermediate) trust level if, for example, the centralized identification service 105 determines that the device 115A is not being used at the expected location specified in the device's profile, but is being used at the same location as other device(s), such as one or more of the devices 115B-E, also associated with the user (e.g., corresponding to the user having traveled away from her home location). In some such examples, the centralized identification service 105 may instead return a green (e.g., highest) trust level if, for example, the centralized identification service 105 determines that the device 115A is not being used at the expected location specified in the device's profile, but is being used at the same location as other device(s), such as one or more of the devices 115B-E, also associated with user and a valid access code is also received from the device 115A (e.g., as entered by the user) in response to a prompt by the centralized identification service 105. The foregoing examples are not intended to be limiting and, as such, the centralized identification service 105 may make these and/or other trust level determinations in response to evaluating activity information associated with a device, such as the device 115A, based on the device's profile.

As mentioned above, the centralized authentication system 100 may support creation of trusted domains associated with network access points, such as the example network access point 125. In some such examples, to determine an authentication level, or trust level, for a device, such as the device 115A, the centralized identification service 105 evaluates the device profile for the device 115A to determine an expected location, such as a home location, for the device. The centralized identification service 105 additionally evaluates device profiles for other devices, such as the devices 115B-E, associated with that same home location (but possibly associated with other users, or the same user), and compares the activity information for the device 115A with the activity information for these other devices 115B-E to return the authentication level, or trust level, for the device 115A. For example, the centralized identification service 105 may return a green (e.g., highest) trust level if, for example, the centralized identification service 105 determines that (1) the device 115A has a registered profile, (2) the device 115A is being used at its expected home location specified in the device's profile, (3) a second device 115B (e.g., a mobile device), which is also associated with that same home location but with a different user, has a registered profile, and (4) the second device 115B is currently located at that home location. Conversely, if the foregoing conditions (2) through (4) are not satisfied, the centralized identification service 105 may return a lower (e.g., red or yellow) trust level, but which may be raised (e.g., to yellow or green) if the user of the device 115A is able to provide a global personal identification number (PIN) that matches information specified in the device's profile. This would allow an online service, such as the online server 110A, to grant access to the device 115A if the user of the device 115A enters the global PIN without requiring entry of a username and password.

In some examples, when the centralized identification service 105 determines that the authentication level, or trust level, for a device, such as the device 115A, is low (e.g., red) based on the device's activity information, the centralized identification service 105 causes a security text message or other communication to be sent to the device 115A (and/or another device associated with the user). If the centralized identification service 105 receives a response to this security text message (or other communication), the centralized identification service 105 in some such examples temporarily raises the authentication level, or trust level, for the device to a higher level (e.g., yellow or green).

In some examples, the centralized identification service 105 stores activity information associated with a registered device, such as the device 115A, in an activity log for the device 115A, which is updated by the home gateway 125 (or the mobile network gateway 130) servicing the device 115A whenever a change associated with the device 115A is detected. For example, when the home gateway 125 (or the mobile network gateway 130) detects communications from a registered device, such as the device 115A, the home gateway 125 (or the mobile network gateway 130) may send a report to the centralized identification service 105 to update the activity log for the device 115A to indicate that the device 115A is at the location associated with the home gateway 125 (or the mobile network gateway 130). Conversely, when the home gateway 125 (or the mobile network gateway 130) no longer detects communications from a registered device, such as the device 115A, the home gateway 125 (or the mobile network gateway 130) may send a report to the centralized identification service 105 to update the activity log for the device 115A to indicate that the device 115A is no longer at the location associated with the home gateway 125 (or the mobile network gateway 130). Additionally or alternatively, the centralized identification service 105 may query a registered device, such as the device 115A, and/or other device(s), such as one or more of the devices 115B-E, also associated with the user, when needed, to obtain location information to be added to the device's activity log (as well as the activity log(s) for the other device(s) associated with the user, if appropriate).

In some examples, the device profile maintained by the centralized identification service 105 for a registered device, such as the device 115A, also specifies (e.g., via user configuration at registration) which online services 110A-F are authorized to use the centralized identification service 105 to authenticate the device 115A (and/or the user of the device 115A). In some such examples, if an unauthorized online service, such as the online service 110A, attempts to perform authentication of a device, such as the device 115A, using the centralized identification service 105, the authorization information returned by the centralized identification service 105 indicates that the online service 110A has not been authorized to request authentication information for that device. In some such examples, the online service 110A can further request that the centralized identification service 105 prompt the user of the device 115A to update the device profile to authorize the online service 110A to authenticate the device 115A via the centralized identification service 105.

In some examples, the home gateway 125 (or the mobile network gateway 130) maintains a local table of identification codes for the devices 115A-E that are currently authenticated with the home gateway 125 (or the mobile network gateway 130). This local table may be updated when, for example, a device, such as the device 115A, is newly detected by the home gateway 125 (or the mobile network gateway 130), or returns after an absence. For example, the device 115A may be a portable laptop which a user takes with her for a weeklong trip. Upon returning home, the device 115A may reconnect with the home gateway 125, and receive a new authentication identification code to associate with the device's profile as part of refresh between the home gateway 125 and the centralized identification service 105. In this way, the home gateway 125 (or the mobile network gateway 130) may maintain an updated, local table of identification codes to append to access requests, thereby reducing the traffic between gateways and the centralized identification service 105 associated with requesting identification codes.

Although the example centralized authentication system 100 includes one (1) example centralized identification service 105, six (6) example online services 110A-F, five (5) example devices 115A-E, one (1) example network 120, and two (2) example network access points 125 and 130, centralized authentication as disclosed herein is not limited thereto. For example, the example centralized authentication system 100 can include more or fewer centralized identification service(s) 105, online service(s) 110A-F, device(s) 115A-E, network(s) 120 and/or network access point(s) 125/130.

Figure 2:
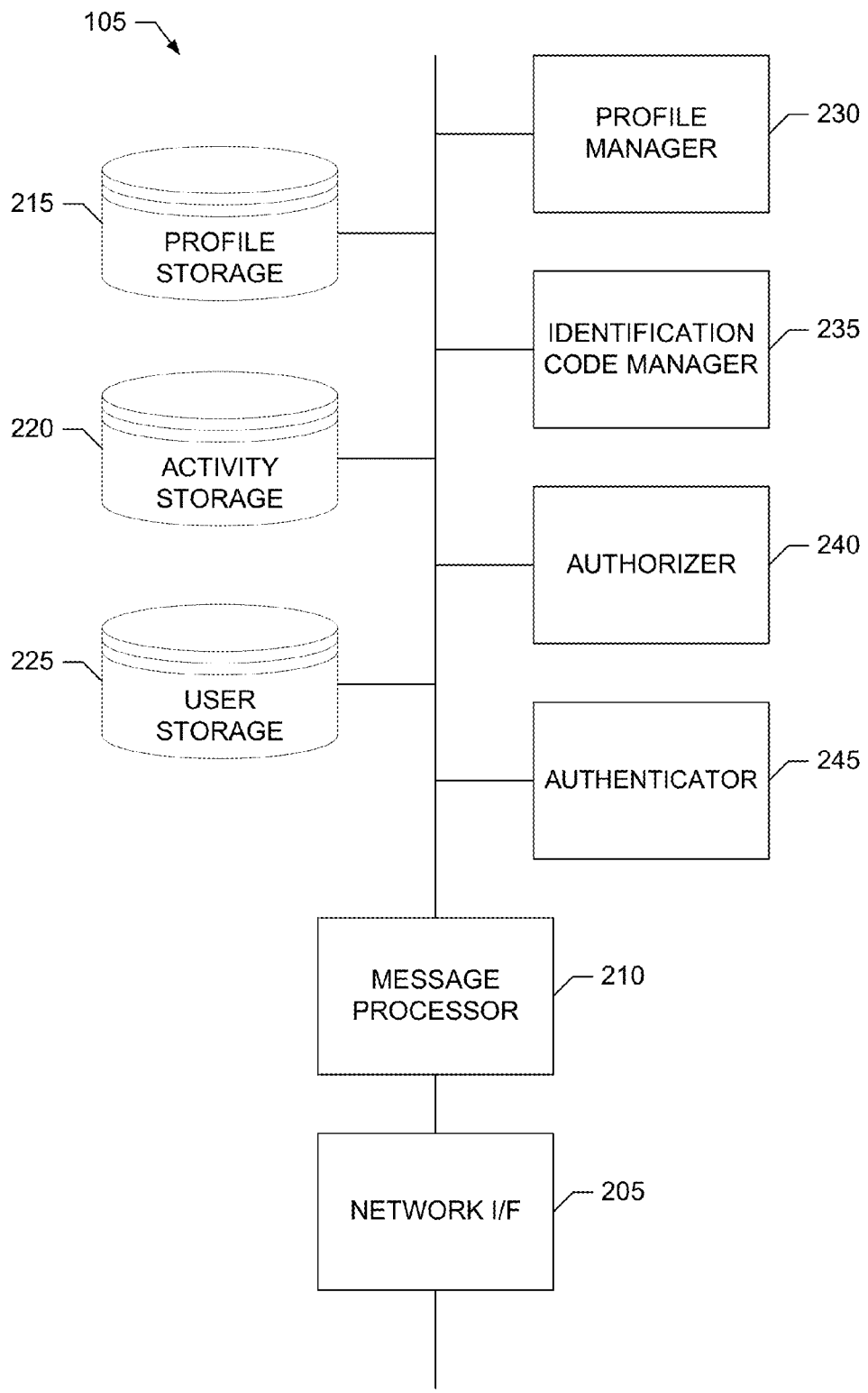
FIG. 2 is a block diagram of an example centralized identification service included in the example centralized authentication system of FIG. 1.

A block diagram of an example implementation of the centralized identification service 105 of FIG. 1 is illustrated in FIG. 2. The example centralized identification service 105 of FIG. 2 includes an example network interface 205 to interface the centralized identification service 105 with a network, such as the example network 120 of FIG. 1. The example network interface 205 can be implemented by any type(s), number(s) and/or combination(s) of network interfaces, such as the example interface circuit 1920 of FIG. 19, which is described in further detail below.

The example centralized identification service 105 of FIG. 2 also includes an example message processor 210 to decode messages received via the example network interface 205 and to encode messages to be transmitted via the example network interface 205. For example, the message processor 210 of FIG. 2 decodes example REGISTRATION REQUEST messages, IDENTIFICATION CODE REQUEST messages, AUTHENTICATION REQUEST messages, PERMISSION REQUEST messages, PROFILE UPDATE RESPONSE messages, etc., which are described in further detail below, received via the example network interface 205 and provides the decoded messages to other elements of the centralized identification service 105 for further processing. The example message processor 210 of FIG. 2 also encodes example IDENTIFICATION CODE RESPONSE messages, AUTHENTICATION RESPONSE messages, PROFILE UPDATE REQUEST messages, etc., which are described in further detail below, obtained from other elements of the centralized identification service 105 to prepare the messages for transmission via the example network interface 205. As such, the message processor 210 encoder implements any appropriate communication protocol or protocols, or combination(s) thereof, to decode the messages received via the example network interface 205 and to encode the messages to be transmitted via the example network interface 205.

The example centralized identification service 105 of FIG. 2 further includes example profile storage 215, example activity storage 220 and example user storage 225 to store data used by the centralized identification service 105 to determine authentication information for registered devices, such as the example devices 115A-E of FIG. 1. In the illustrated example of FIG. 2, the profile storage 215 stores the profiles maintained by the centralized identification service 105 for different ones of the registered devices (e.g., the devices 115A-E). The activity storage 220 stores the activity information (e.g., in the form of activity logs) maintained by the centralized identification service 105 for different ones of the registered devices (e.g., the devices 115A-E). The user storage 225 stores the user information (e.g., such as information identifying the particular user associated with a given device, billing information associated with a given device, etc.) maintained by the centralized identification service 105 for different ones of the registered devices (e.g., the devices 115A-E). The example profile storage 215, the example activity storage 220 and/or the example user storage 225 may be implemented by any number(s) and/or type(s) of volatile and/or non-volatile memory, storage, etc., or combination(s) thereof, such as the example volatile memory 1914 and/or the example mass storage device(s) 1928 included in the example of FIG. 19.

The example centralized identification service 105 of FIG. 2 also includes an example profile manager 230 to register devices, such as the devices 115A-E, with the centralized identification service 105, and to create and manage profiles associated with respective ones of the devices. For example, in response to a REGISTRATION REQUEST message, the example profile manager 230 of FIG. 2 performs a registration procedure with a device, such as the device 115A, identified in the REGISTRATION REQUEST message (e.g., by one or more device identifiers included in the message) to obtain profile information to be included in a profile associated with the device 115A. In some examples, the profile manager 230 causes the device 115A to present a registration interface by which a user of the device 115A is able to enter the profile information. The profile manager 230 of the illustrated example then stores the profile information in a profile that includes and/or is otherwise indexed by, mapped to, linked to, etc., the device identifier(s) included in the REGISTRATION REQUEST message. Examples of the profile information obtained by the registration procedure include, but are not limited to, mobility information specified for the device (e.g., such as whether the device is mobile, not mobile (e.g., fixed), etc.), a location associated with the device (e.g., such as whether the device is expected to be located at the same location associated with a given gateway), sharing information specified for the device (e.g., such as whether the device is a personal device to be associated with one user or a shared device capable of being used by multiple users), billing authorization information (e.g., such as whether the device, or a user of the device, is authorized to make purchases), service authorization information (e.g., such as information specifying which service(s) is(are) permitted to request authentication information for the device from the centralized identification service), etc.

In some examples, if authorized by the billing authorization information obtained via the registration procedure, the profile manager 230 also automatically includes billing information in the profile for the device 115A. For example, the billing information may be obtained from the user storage 225 and include payment information (e.g., credit card information, banking information), a billing address, shipping preferences, etc., for a person associated with an expected location of the 115A. In some examples in which the profile information specifies or otherwise indicates that the device 115A is expected to access the network 120 via the home gateway 125, the profile manager 230 accesses the billing information associated with the home gateway 125 (e.g., which corresponds to the billing information for a subscriber renting the home gateway 125) and stores this information as the billing information maintained in the profile for the device 115A.

The example centralized identification service 105 of FIG. 2 includes an example identification code manager 235 to manage authentication identification codes assigned to access requests made by devices, such as the devices 115A-E, to request access to online services, such as the online services 110A-F. The identification codes act as temporary device identifiers to be included in messages exchanged in the centralized authentication system 100 for the purpose of performing authentication. The identification codes are also used by the centralized identification service 105 to select profiles and provide authentication information for particular ones of the devices 115A-E. In the illustrated example of FIG. 2, the identification code manager 235 assigns an identification code to a particular device (or otherwise associates an identification code with a particular device) in response to receipt of an IDENTIFICATION CODE REQUEST message including an identifier of the device. For example, in response to an IDENTIFICATION CODE REQUEST message sent by a requestor (e.g., such as the home gateway 125 or the mobile network gateway 130) and including a device identifier (e.g., MAC address, ESN, phone number, etc.) associated with device 115A, the identification code manager 235 assigns an identification code and associates the identification code with the profile maintained in the profile storage 215 for the device 115A. The identification code manager 235 then returns the identification code to the requestor in an IDENTIFICATION CODE RESPONSE message.

The example centralized identification service 105 of FIG. 2 also includes an example authorizer 240 to determine whether an online service, such as the online service 110A, requesting authentication information for a particular device, such as the device 115A, is authorized to access the authentication information. For example, in response to an AUTHENTICATION REQUEST message received from the online service 110A for authentication information associated with the device 115A, and which includes an identification code previously assigned by the identification code manager 235 to identify the device 115A, the authorizer 240 uses the identification code to access the profile maintained in the profile storage 215 for the device 115A. The authorizer 240 processes the profile for the device 115A to determine whether the profile information contained therein authorizes the online service 110A to access authentication information for the device 115A. If the online service 110A is authorized to access the authentication information, the authorizer 240 invokes an example authenticator 245 to determine the authentication information for the device 115A, which is then included in an AUTHENTICATION RESPONSE message to be sent to the online service 110A. However, if the online service 110A is not authorized to access the authentication information, the authorizer 240 returns an AUTHENTICATION RESPONSE message indicating that the online service 110A is not permitted to access the authentication information for the device 115A.

In some examples, the authorizer 240 returns an AUTHENTICATION RESPONSE message indicating that the request for authentication information was invalid if the authorizer 240 determines the authentication identification code included in the AUTHENTICATION REQUEST message received from the online service 110A is invalid. For example, the authorizer 240 may determine that the identification code is invalid if the identification code has expired, does not match any previously assigned identification code, etc.

In some examples, the authorizer 240 is able to process requests by online services to be given permission to access authentication information for particular devices. For example, after sending the AUTHENTICATION RESPONSE message indicating that the online service 110A is not permitted to access the authentication information for the device 115A, the authorizer 240 may receive a PERMISSION REQUEST message from the online service 110A requesting permission to access the authentication information for the device 115A. In response to such a PERMISSION REQUEST message, the authorizer 240 of the illustrated example sends a PROFILE UPDATE REQUEST message to the device 115A to request a user of the device to update the device's profile to indicate whether the online service 110A is permitted to access authentication information for the device 115A. If a PROFILE UPDATE RESPONSE message is received from the device 115A in response to the PROFILE UPDATE REQUEST message, the authorizer 240 updates the profile of the device 115A to grant or deny the online service 110A permission to access the authentication information for the device 115A in accordance with the permission specified in the PROFILE UPDATE RESPONSE message. If no PROFILE UPDATE RESPONSE message is received from the device 115A in response to the PROFILE UPDATE REQUEST message, the profile of the device 115A remains unchanged.

The example centralized identification service 105 of FIG. 2 further includes the example authenticator 245 to determine authentication information for devices, such as the devices 115A-E, in response to requests from online services, such as the online services 110A-F. For example, in response to an AUTHENTICATION REQUEST message received from the online service 110A for authentication information associated with the device 115A, and which includes a valid identification code previously assigned by the identification code manager 235 to identify the device 115A, the authenticator 245 uses the identification code to access the profile maintained in the profile storage 215 for the device 115A (e.g., assuming the authorizer 240 has already determined that the profile permits the online service 110A to access the authentication information). The authenticator 245 of the illustrated example then evaluates, based on the profile associated with the device 115A, activity information maintained in the activity storage 220 for the device 115A to determine authentication information associated with the device 115A. As described above, in some examples, the authentication information determined by the authenticator 245 includes an authentication level, or trust level or level of trust, for the device 115A, which indicates a level of certainty that the device 115A is being used properly and/or the registered device user is actually using the device 115A. In some examples, the authentication information includes a trusted identity of the device and/or a user of the device, which is specified in the profile for the device 115A. In some such examples, the level of trust included in the authentication information also indicates the level of trust associated with the trusted identity included in the authentication information. In some examples, the authentication information includes other information specified in the profile for the device 115A, such as billing information associated with the device 115A, a location of the device 115A and/or an indication whether the device 115A is located at its expected location, etc.

For example, possible trust levels may be green, yellow and red corresponding, respectively, to high, intermediate and low levels of trust, although determining and returning fewer or more levels of trust may be supported by the authenticator 245 in other examples. In some such examples, if the activity information available for the device 115A is sufficiently complete to permit a complete comparison of the information specified in the device's profile against the device's activity information, and the activity information indicates that the device 115A is being used as expected based on the information specified in the device's profile, the authenticator 245 indicates a green (e.g., highest) trust level in the authentication information returned for the device 115A. Conversely, if the activity information for the device 115A is unavailable or indicates that the device 115A is not being used as expected based on the information specified in the device's profile, the authenticator 245 indicates a red (e.g., lowest) trust level in the authentication information returned for the device 115A. In some examples, if the activity information for the device 115A is incomplete and permits only a partial comparison of the information specified in the device's profile against the device's activity information, but the incomplete activity information is consistent with the information specified in the device's profile, the authenticator 245 indicates a yellow (e.g., intermediate) trust level in the authentication information returned for the device 115A.

For example, the profile for the device 115A may specify an access code to be provided by the device 115A and evaluated by the authenticator 245 to determine the authentication information for the device 115A. In some such examples, when determining the authentication information for the device 115A, the authenticator 245 prompts the device 115A (e.g., via a CODE PROMPT message) to provide the access code. If the device 115A responds with the access code (e.g., via a CODE RESPONSE message), the authenticator 245 includes the access code in the activity information for the device 115A and evaluates the access code along any other available activity information to determine the trust level for the device 115A. However, if no response is received, but the other available activity information is consistent with the information specified in the device's profile, the authenticator 245 may indicate a yellow (e.g., intermediate) trust level in the authentication information returned for the device 115A (e.g., because the access code is missing and, thus, the activity information for the device 115A is incomplete).

The following examples further illustrate operation of the example authenticator 245 to evaluate activity information based on a device profile to determine different trust levels to include in the authentication information for the device 115A. However, these examples are not intended to be limiting and, as such, the authenticator 245 may make these and/or other trust level determinations in response to evaluating activity information associated with the device 115A based on the device's profile. In some examples, the activity information evaluated by authenticator 245 includes a current location of the device 115A, and the authenticator 245 may evaluate the current location of the device 115A against mobility information and expected location information specified in the device's profile to determine a level of trust to be associated with the device 115A. For example, the profile for the device 115A may include mobility information specifying whether the device 115A is mobile or not mobile (e.g., fixed). The profile for the device 115A may further include an expected location of the device 115A, which may be specified as a geographic location (e.g., corresponding to a zip code, global positioning system (GPS) coordinates, etc.), as a network address of a network access point (e.g., such as the gateways 125 and/or 130) via which the device 115A is expected to access a network, such as the network 120, etc. In some such examples, if the profile specifies that the device 115A is not mobile (e.g., fixed) and the activity information indicates the device 115A is currently located at the location specified in the profile, then the authenticator 245 indicates a green (e.g., highest) trust level in the authentication information returned for the device 115A. If the profile further specifies an access code, the authenticator 245 may indicate the green (e.g., highest) trust level in the authentication information returned for the device 115A if the access code is present and correct, but indicate the yellow (e.g., intermediate) trust level if the access code is not present, but the activity information indicates the device 115A is currently located at the location specified in the profile. However, if the device 115A is not mobile (e.g., fixed) and the activity information indicates the device 115A is not currently located at the location specified in the profile, or an access code is specified in the profile and the provided access code is incorrect, then the authenticator 245 may indicate a red (e.g., lowest) trust level in the authentication information returned for the device 115A.

In some examples, the device profile for the device 115A specifies other devices, such as one or more of the devices 115B-E, to be associated with the device 115A (e.g., because they are associated with the same user or group of users, etc.). These other devices are also referred to herein as secondary devices. In some such examples, the activity information evaluated by the authenticator 245 for the device 115A includes activity information associated with these other, secondary device(s). For example, the authenticator 245 may determine a green (e.g., highest) trust level for the device 115A if the authenticator 245 determines that (1) the device 115A is being used at an expected location specified in the device's profile, (2) a valid access code was received and (3) a second device, such as one of the devices 115B-E, associated with the device 115A in the device's profile is also detected at the same location (e.g., the devices are co-located). In some examples, the authenticator 245 may return a yellow (e.g., intermediate) trust level if, for example, the authenticator 245 determines that the device 115A is not being used at the expected location specified in the device's profile, but is co-located with (e.g., at the same location as) other secondary device(s), such as one or more of the devices 115B-E, associated with the device 115A in the device's profile (e.g., corresponding to the user having traveled away from her home location). In some such examples, the authenticator 245 may instead return a green (e.g., highest) trust level if, for example, the authenticator 245 determines that the device 115A is not being used at the expected location specified in the device's profile, but is being used at the same location as other device(s), such as one or more of the devices 115B-E, associated with device 115A in the device's profile, and a valid access code is also received from the device 115A (e.g., as entered by the user) in response to a prompt by the authenticator 245. In some such examples, the authenticator 245 may return a yellow (e.g., intermediate) trust level if, for example, the authenticator 245 determines that the device 115A is being used at the expected location specified in the device's profile, but no other authentication information is available (e.g., no access code is received, and no secondary devices are co-located with the device 115A). In some such examples, the authenticator 245 may return a red (e.g., lowest) trust level if, for example, the authenticator 245 determines that the device 115A is not being used at the expected location specified in the device's profile, and no other authentication information is available (e.g., no access code is received, and no secondary devices are co-located with the device 115A).

Figure 3:
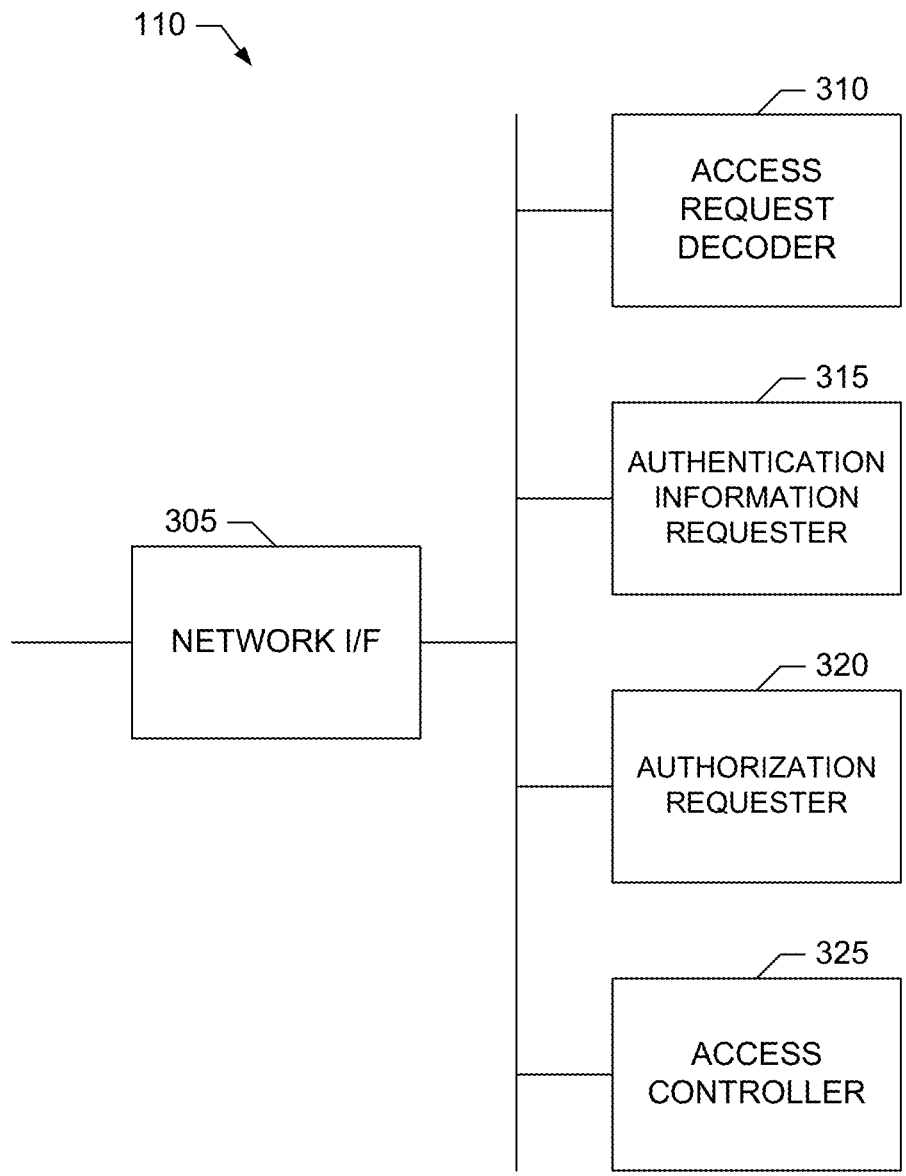
FIG. 3 is a block diagram of an example online service included in the example centralized authentication system of FIG. 1.

A block diagram of an example implementation of an example online service 110, which may be used to implement one or more of the example online services 110A-F of FIG. 1, is illustrated in FIG. 3. FIG. 3 illustrates structures used to implement centralized authentication in the online service 110 in accordance with the teachings of this disclosure. Other structures of the online service 110 directed to implementing other service functionality not associated with centralized authentication are omitted for clarity.

The example online service 110 of FIG. 3 includes an example network interface 305 to interface the online service 110 with a network, such as the example network 120 of FIG. 1. The example network interface 305 can be implemented by any type(s), number(s) and/or combination(s) of network interfaces, such as the example interface circuit 2020 of FIG. 20, which is described in further detail below.

The example online service 110 of FIG. 3 also includes an example access request decoder 310 to decode access requests received from devices, such as the device 115A. In the illustrated example of FIG. 3, the access request decoder 310 further detects whether an authorization identification code is included in the access request message (e.g., such as appended to an HTTP request). If an identification code is detected, the access request decoder 310 determines that centralized authentication is available for the device 115A requesting access to the service 110. However, if an identification code is not detected, the access request decoder 310 determines that centralized authentication is not available for the device 115A requesting access to the service 110.

The example online service 110 of FIG. 3 further includes an example authentication information requester 315 to request authentication information from a centralized identification service, such as the centralized identification service 105, for a device requesting access, such as the device 115A. In the illustrated example of FIG. 3, if the access request decoder 310 detects an identification code in an access request received from the device 115A, the authentication information requester 315 sends an AUTHENTICATION REQUEST message including the identification code (e.g., which acts as a temporary identifier for the device 115A) to the centralized identification service 105 to request authentication information for the device 115A. Then, in response to the AUTHENTICATION REQUEST message, the authentication information requester 315 receives an AUTHENTICATION RESPONSE message from the centralized identification service 105. In some examples, the AUTHENTICATION RESPONSE message includes authentication information, such as a trust level, for the device 115A if the online service 110 is permitted to access authentication information for the device 115A (e.g., as specified in the device's profile maintained by the centralized identification service 105). However, if the online service 110 is not permitted to access authentication information for the device 115A (e.g., as specified in the device's profile maintained by the centralized identification service 105), the AUTHENTICATION RESPONSE message may omit the authentication information for the device 115A and, instead, include information indicating that the online service 110 is not authorized to access the authentication information for the device 115A.

In some examples, the online service 110 of FIG. 3 includes an example authorization requestor 320 to request permission to access authentication information from a centralized identification service, such as the centralized identification service 105, for a device requesting access, such as the device 115A. For example, if the AUTHENTICATION RESPONSE message received by the authentication information requester 315 indicates that the online service 110 is not permitted to access the authentication information for the device 115A, the authorization requestor 320 may send a PERMISSION REQUEST message to the centralized identification service 105 to request permission to have access to the authentication information associated with device 115A. In some examples, the PERMISSION REQUEST message includes the identification code detected in the access request received from the device 115A (which acts as an identifier of the device 115A).

The online service 110 of FIG. 3 includes an example access controller 325 to determine whether to grant access to a device, such as the device 115A. In the illustrated example of FIG. 3, the access controller 325 determines whether to grant access to the device 115A based on centralized authentication information if, for example, such information was requested (e.g., in response to detecting an identification code in the access request from the device 115A) and received from a centralized identification service, such as the centralized identification service 105 (e.g., if the online service 110 was determined by the centralized identification service 105 to have permission to access the authentication information). In some examples, the access controller 325 determines whether to grant access to the device 115A based on only the centralized authentication information returned by the centralized identification service 105 (e.g., without prompting the device 115A, or the user of the device, for additional authentication information, such as a username and/or password). For example, if the centralized authentication information returned by the centralized identification service 105 for the device 115A indicates a green (e.g., high) trust level for the device 115A, the access controller 325 of the illustrated example may automatically grant access to the device 115A. Conversely, if the centralized authentication information returned by the centralized identification service 105 for the device 115A indicates a red (e.g., low) trust level for the device 115A, the access controller 325 of the illustrated example may automatically deny access to the device 115A.

In some examples, the access controller 325 also implements a local access control procedure specific to the online service 110. For example, if the access request received from the device 115A does not include an identification code (e.g., indicating that centralized authentication is not available/configured for the device 115A) or the authentication response returned by the centralized identification service 105 for the device 115A indicates that the online service 110 is not permitted to access the authentication information associated with the device 115A, the access controller 325 performs a local access control procedure to determine whether to grant access to the device 115A. The local access control procedure performed by the example access controller 325 can include, but is not limited to, any one or more access control procedures, or combination thereof, by which authentication information, such as a username, a password, biometric data, etc., is obtained from the device 115A (and/or a user of the device 115A) and evaluated to determine whether to grant the device 115A access to the online service 110. In some such examples, if the local authentication information is sufficient to authenticate the device 115A (e.g., such as when the username, password, biometric data, etc., obtained via the local access control procedure matches the reference data already stored for the device 115A and/or the user of the device), the access controller 325 grants access to the device 115A. Otherwise, the access controller 325 denies access to the device 115A.

In some examples, the access controller 325 uses a combination of the centralized authentication information returned by the centralized identification service 105 for the device 115A and local authentication information determined by a local access control procedure to determine whether to grant access to the device 115A. For example, if the centralized authentication information returned by the centralized identification service 105 for the device 115A indicates an yellow (e.g., intermediate) trust level for the device 115A, the access controller 325 may perform its local access control procedure to determine local authentication information to be used (e.g., as described above) to make a final determination as to whether to grant access to the device 115A.

Figure 4:
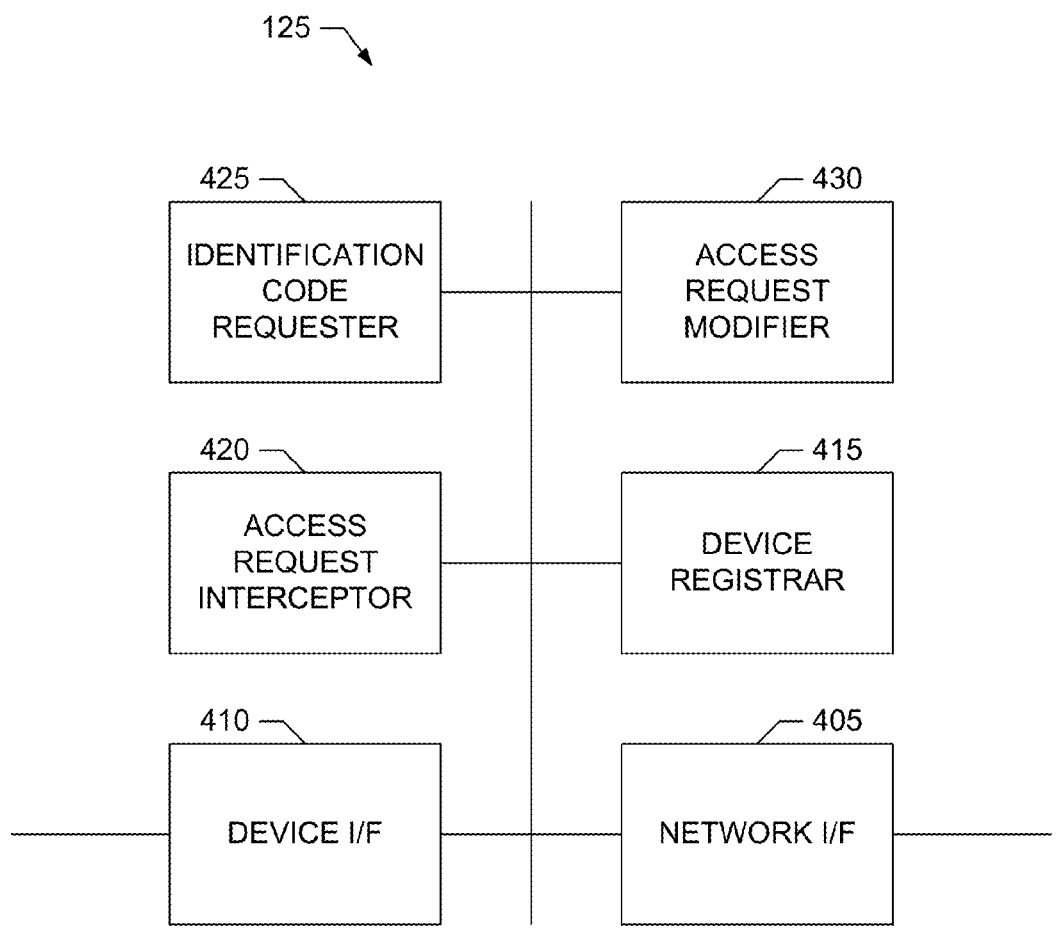
FIG. 4 is a block diagram of an example network access point included in the example centralized authentication system of FIG. 1.

A block diagram of an example implementation of the example network access point 125 of FIG. 1 is illustrated in FIG. 4. FIG. 4 illustrates structures used to implement centralized authentication in the example network access point 125 in accordance with the teachings of this disclosure. Other structures of the example network access point 125 directed to implementing other functionality not associated with centralized authentication are omitted for clarity. Some or all of the structures illustrated in FIG. 4 may additionally or alternatively be used to implement the example network access point 130 of FIG. 1.

The example network access point 125 of FIG. 4 includes an example network interface 405 to interface the network access point 125 with a network, such as the example network 120 of FIG. 1. The example network interface 405 can be implemented by any type(s), number(s) and/or combination(s) of network interfaces. The example network access point 125 of FIG. 4 also includes an example device interface 410 to interface the network access point 125 with one or more devices, such as the devices 115A-E of FIG. 1. The example network interface 405 can be implemented by any type(s), number(s) and/or combination(s) of device interfaces. For example, the network interface 405 and/or the example device interface 410 can be implemented by the example interface circuit 2120 of FIG. 21, which is described in further detail below.

The example network access point 125 of FIG. 4 includes an example device registrar 415 to determine whether a device, such as the device 115A, that is accessing the network access point 125 is already registered with a centralized identification service, such as the centralized identification service 105, supporting centralized authentication in accordance with the teachings of this disclosure. In some examples, the device registrar 415 maintains a history (e.g., in a table, database, listing, etc.) of devices that have accessed the network access point 125. In some such examples, if the device 115A is included in this access history, the network access point 125 presumes the device 115A is registered with the centralized identification service 105. However, if the device 115A is not included in the access history, the network access point 125 presumes the device 115A is not registered with the centralized identification service 105 and, thus, sends a REGISTRATION REQUEST message to the centralized identification service 105. In some examples, the REGISTRATION REQUEST message includes an identifier (e.g., a MAC or other network address for the device, a telephone number, an ESN, etc.) of the device 115A, which permits the centralized identification service 105 to contact the device 115A and perform a registration procedure.

The example network access point 125 of FIG. 4 also includes an example access request interceptor 420 to intercept access requests sent by devices, such as the devices 115A-E, to online services, such as the online services 110A-F. In some examples, the access request interceptor 420 processes messages received from the devices 115A-E to detect messages, such as HTTP request messages, which are typically used by computing devices to access online services.

The example network access point 125 of FIG. 4 further includes an example identification code requester 425 to request authentication identification codes to be assigned for the purpose of performing centralized authentication of the devices associated with such access requests. For example, in response to the access request interceptor 420 intercepting an access request sent by the device 115A to the online service 110A, the identification code requester 425 of the illustrated example sends an IDENTIFICATION CODE REQUEST message to a centralized identification service, such as the centralized identification service 105, to request an identification code to be associated with the device corresponding to an intercepted access request. In some examples, the IDENTIFICATION CODE REQUEST message includes an identifier (e.g., a MAC or other network address for the device, a telephone number, an ESN, etc.) of the device 115A, which permits the centralized identification service 105 to identify a profile associated with the device 115A. Then, in response to the IDENTIFICATION CODE REQUEST message, the identification code requester 425 receives an IDENTIFICATION CODE RESPONSE message from the centralized identification service 105, which includes the identification code to be associated with the device 115A corresponding to the intercepted access request. As discussed above, in some examples, the centralized identification service 105 determines the identification code such that it can act as a temporary identifier of the device 115A (e.g., for a limited duration of time).

The example network access point 125 of FIG. 4 also includes an example access request modifier 430 to modify an access request, which was intercepted by the access request interceptor 420, to include an authentication identification code, which was requested by the identification code requester 425. The network access point 125 then forwards the modified access request to the target online service. In some examples, the access request modifier 430 appends the identification code to the access request. For example, if the access request is an HTTP request, the access request modifier 430 may append the identification code as a query string or other field of the HTTP request. In some such examples, online services not supporting centralized authentication as disclosed herein will ignore the identification code appended to the access request, thereby making centralized authentication backwards compatible with such legacy online services.

Figure 5:
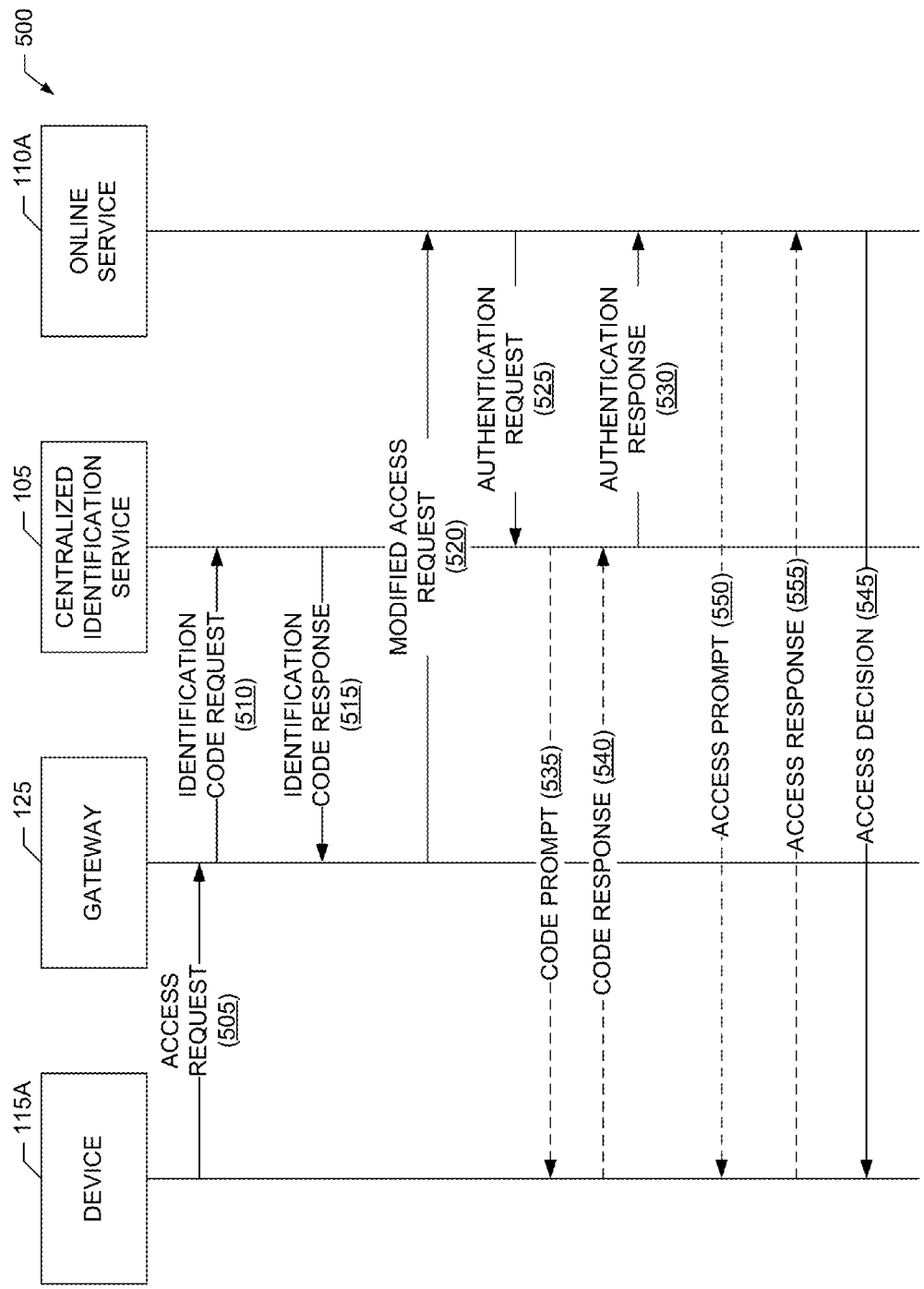
FIGS. 5-7 are example message sequence diagrams illustrating example sequences of messages exchanged in the example centralized authentication system of FIG. 1 to implement centralized authentication for granting access to online services in accordance with the teachings of this disclosure.

An example message sequence diagram 500 illustrating a first example sequence of messages that may be exchanged among the example centralized identification service 105, the example online service 110A, the example device 115A and the example network access point 125 of the example centralized authentication system 100 of FIG. 1 to implement centralized authentication in accordance with the teachings of this disclosure is illustrated in FIG. 5. The example message sequence diagram 500 corresponds to an example scenario in which the online service 110A is permitted, based on a profile maintained by the centralized identification service 105 for the device 115A, to access centralized authentication information associated with the device 115A. The messages illustrated in the example message sequence diagram 500 may be implemented by existing, new and/or adapted messages conforming to any appropriate communication protocol, such as HTTP, SIP (session initiation protocol), etc.

The example message sequence diagram 500 of FIG. 5 begins with the network access point 125 intercepting an example ACCESS REQUEST message 505 (e.g., such as an HTTP request message) sent by the device 115A to request access to the online service 110A. In response to the intercepting the ACCESS REQUEST message 505, the network access point 125 sends an example IDENTIFICATION CODE REQUEST message 510, which includes an identifier (e.g., a MAC or other network address for the device, a telephone number, an ESN, etc.) of the device 115A to the centralized identification service 105 to request an authentication identification code to be associated with the intercepted ACCESS REQUEST message 505. In response to the IDENTIFICATION CODE REQUEST message 510, the centralized identification service 105 sends an example IDENTIFICATION CODE RESPONSE message 515 to the network access point 125, which includes the identification code to be associated with the device 115A corresponding to the intercepted ACCESS REQUEST message 505. The network access point 125 then appends or otherwise includes the received identification code in the intercepted ACCESS REQUEST message 505 to generate an example MODIFIED ACCESS REQUEST message 520, which the network access point 125 forwards to the online service 110A.

Next, in response to receiving the MODIFIED ACCESS REQUEST message 520, the online service 110A sends an example AUTHENTICATION REQUEST message 525, which includes the authentication identification code from the MODIFIED ACCESS REQUEST message 520, to the centralized identification service 105 to request authentication information for the device 115A. In response to the AUTHENTICATION REQUEST message 525, the centralized identification service 105 accesses a profile for the device 115A (e.g., selected using the identification code, if valid, which acts as a temporary identifier for the device 115A), which the centralized identification service 105 uses to determine centralized authentication information for the device 115A based on evaluating activity information maintained for the device 115A. In the illustrated example of FIG. 5, the profile for the device 115A permits the online service 110A to access the centralized authentication information for the device 115A. Accordingly, in response to the AUTHENTICATION REQUEST message 525, the centralized identification service 105 determine authentication information to be included in an example AUTHENTICATION RESPONSE message 530 sent back to the online service 110A.

In some examples, the centralized identification service 105 determines the authentication information for inclusion in the AUTHENTICATION RESPONSE message 530 without requesting any authentication-related information from a user of the device 115A. However, in other examples, the profile for the device 115A specifies an access code and/or other authentication-related information to be provided by the device 115A (and/or a user of the device 115A) for use in determining the authentication information for inclusion in the AUTHENTICATION RESPONSE message 530. In some such examples, the centralized identification service 105 sends an example CODE PROMPT message 535 to the device 115A to request the access code and/or other authentication-related information specified in the profile for the device 115A. In response to the CODE PROMPT message 535, the device 115A sends an example CODE RESPONSE message 540 to the centralized identification service 105 which, in the illustrated example, includes the requested access code and/or other authentication-related information.

After determining the centralized authentication information associated with the device 115A, the centralized identification service 105 sends the example AUTHENTICATION RESPONSE message 530, which includes the centralized authentication information, the online service 110A. Based on the centralized authentication information includes in the AUTHENTICATION RESPONSE message 530, the online service 110A determines whether to grant access to the device 115A and informs the device 115A of its decision in an example ACCESS DECISION message 545 sent to the device 115A. (In some examples, rather than expressly sending an ACCESS DECISION message 545, the online service 110A just grants the device 115A access to a home screen, data, etc., provided by the service itself.) In some examples, the online service 110A determines whether to grant access to device 115A based on the centralized authentication information included in the AUTHENTICATION RESPONSE message 530 and without requesting any further authentication-related information from a user of device 115A. However, in other examples, the online service 110A also performs a local access procedure to determine local authentication information to be used with the centralized authentication information to determine whether to grant access to the device 115A. In some such examples, the online service 110A sends an example ACCESS PROMPT message 550 to the device 115A to request such local authentication information (e.g., such as a username, a password, biometric data, etc., or any combination thereof), which the device 115A returns in an example ACCESS RESPONSE message 555. (In some examples, rather than expressly exchanging the ACCESS PROMPT message 550 and the ACCESS RESPONSE message 555, the online service 110A implements a login screen or other user interface by which the device 115A and/or a user of the device 115A is able to provide the requested local authentication information.)

Figure 6:
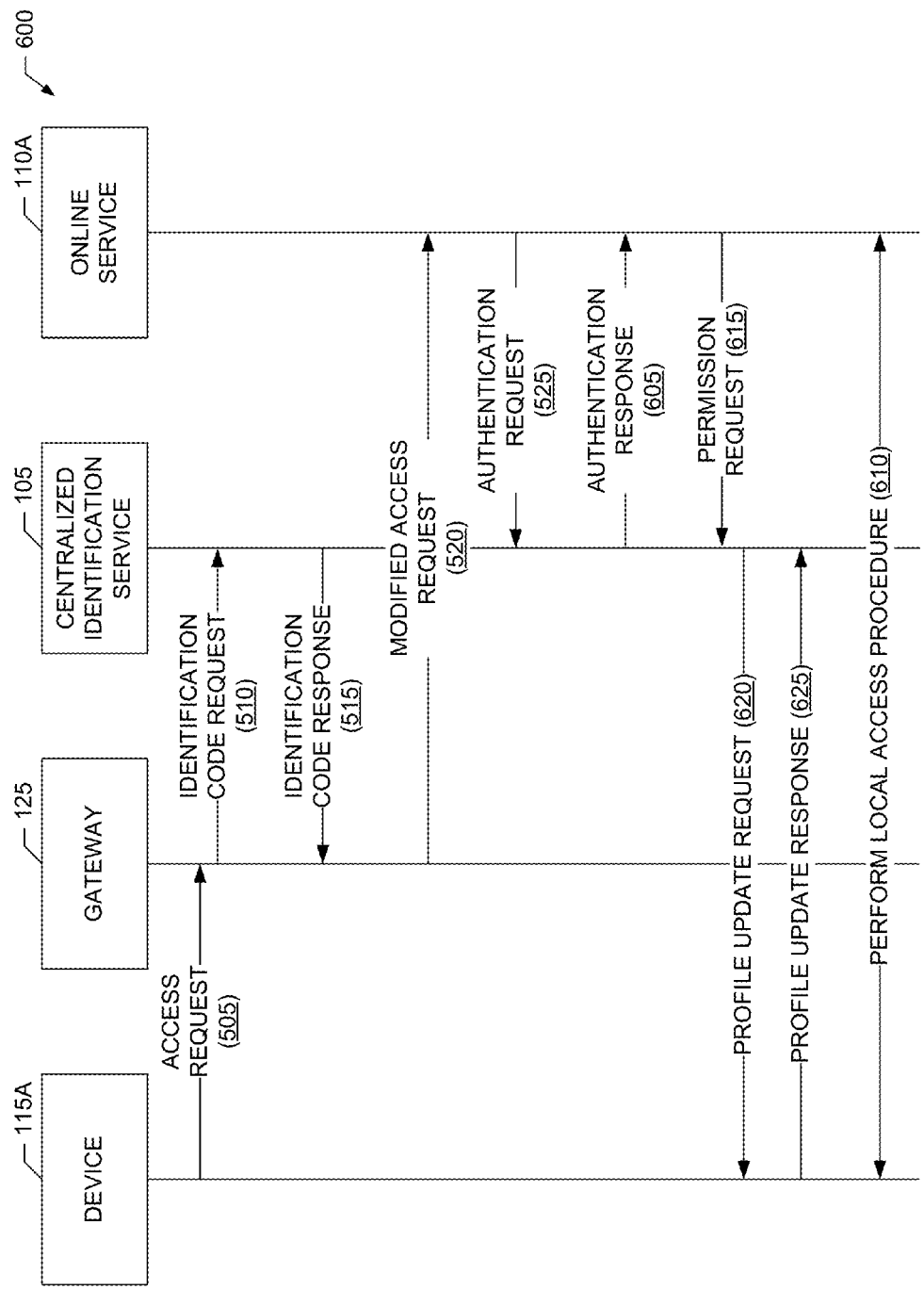

An example message sequence diagram 600 illustrating a second example sequence of messages that may be exchanged among the example centralized identification service 105, the example online service 110A, the example device 115A and the example network access point 125 of the example centralized authentication system 100 of FIG. 1 to implement centralized authentication in accordance with the teachings of this disclosure is illustrated in FIG. 6. The example message sequence diagram 600 corresponds to an example scenario in which the online service 110A is not permitted, based on a profile maintained by the centralized identification service 105 for the device 115A, to access centralized authentication information associated with the device 115A. The messages illustrated in the example message sequence diagram 600 may be implemented by existing, new and/or adapted messages conforming to any appropriate communication protocol, such as HTTP, SIP (session initiation protocol), etc.

The example message sequence diagram 600 of FIG. 6 begins with the example ACCESS REQUEST message 505, the example IDENTIFICATION CODE REQUEST message 510, the example IDENTIFICATION CODE RESPONSE message 515, the example MODIFIED ACCESS REQUEST message 520 and the example AUTHENTICATION REQUEST message 525, which are described above in connection with the example message sequence diagram 500 of FIG. 5. However, in the example message sequence diagram 600 of FIG. 6, the profile for the device 115A does not permit the online service 110A to access the centralized authentication information for the device 115A. Accordingly, in response to the AUTHENTICATION REQUEST message 525, the centralized identification service 105 sends an example AUTHENTICATION RESPONSE message 605 back to the online service 110A, which indicates that the online service 110A does not have permission to access the requested centralized authentication information for the device 115A. Accordingly, the online service 110A performs an example local access procedure 610 to determine whether to grant access to the device 115A.

Additionally, in response to the AUTHENTICATION RESPONSE message 605, the online service 110A sends an example PERMISSION REQUEST message 615 to the centralized identification service 105 requesting permission to access the centralized authentication information for the device 115A. In response to the PERMISSION REQUEST message 615, the centralized identification service 105 sends an example PROFILE UPDATE REQUEST message 620 to the device 115A to request a user of the device to update the device's profile to indicate whether the online service 110A is permitted to access the centralized authentication information for the device 115A. In the illustrated example of FIG. 6, in response to the PROFILE UPDATE REQUEST message 620, the device 115A sends an example PROFILE UPDATE RESPONSE message 625 to the centralized identification service 105, which includes updated profile information indicating whether to grant or deny the online service 110A permission to access the centralized authentication information for the device 115A.

Figure 7:
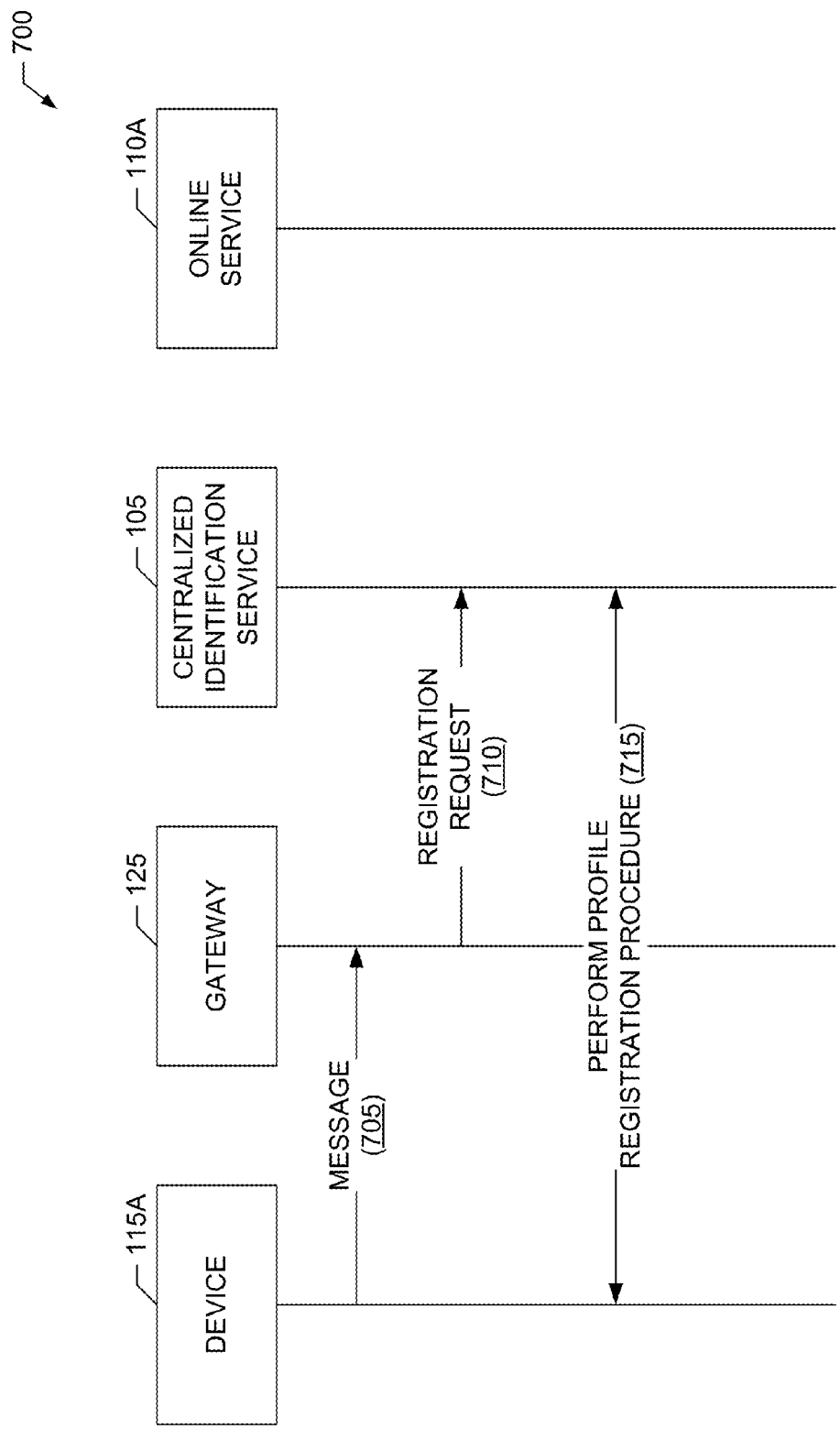

An example message sequence diagram 700 illustrating a third example sequence of messages that may be exchanged among the example centralized identification service 105, the example online service 110A, the example device 115A and the example network access point 125 of the example centralized authentication system 100 of FIG. 1 to implement centralized authentication in accordance with the teachings of this disclosure is illustrated in FIG. 7. The example message sequence diagram 700 corresponds to an example scenario in which the device 115A is to be registered by the centralized identification service 105. The messages illustrated in the example message sequence diagram 700 may be implemented by existing, new and/or adapted messages conforming to any appropriate communication protocol, such as HTTP, SIP (session initiation protocol), etc.

The example message sequence diagram 700 of FIG. 7 begins with the network access point 125 detecting a message 705 sent by the device 115A. The message 705 can be any message sent by the device 115A to communicate with a destination endpoint (e.g., such one or the online services 110A-F) or the network access point 125 itself. In response to the message 705, the network access point 125 examines its access history to determine whether the network access point 125 previously received one or more messages from device 115A (e.g., possibly limited to being within a history window of time). In the illustrated example, the network access point 125 fails to find the device 115A in its access history. Accordingly, the network access point 125 sends an example REGISTRATION REQUEST message 710, which includes an identifier (e.g., a MAC or other network address for the device, a telephone number, an ESN, etc.) of the device 115A, to the centralized identification service 105. In response to the REGISTRATION REQUEST message 710, the centralized identification service 105 performs a an example profile registration procedure 715 with the device 115A to determine a profile for the device 115A, which permits the centralized identification service 105 to later determine authentication information for the device 115A.

FIGS. 8-12 illustrate example an example registration interface implemented by the example profile manager 230 of the example centralized identification service 105 to perform the example profile registration procedure 715 to register devices, such as the device 115A, in the example centralized authentication system 100. In the illustrated example of FIGS. 8-12, the registration interface corresponds to different user interface screens that the profile manager 230 of the example centralized identification service 105 causes the device 115A to present (e.g., in a web browser, in an application executing on the device 115A, etc.) to permit a user of the device 115A to enter profile information to be included in a profile associated with the device 115A. (However, in some examples, the profile registration procedure 715 may additionally or alternatively be implemented by a network access point, such as the network access points 125 and/or 130, with the entered profile information being reported by the network access point to the profile manager 230 of the example centralized identification service 105).

Figure 8:
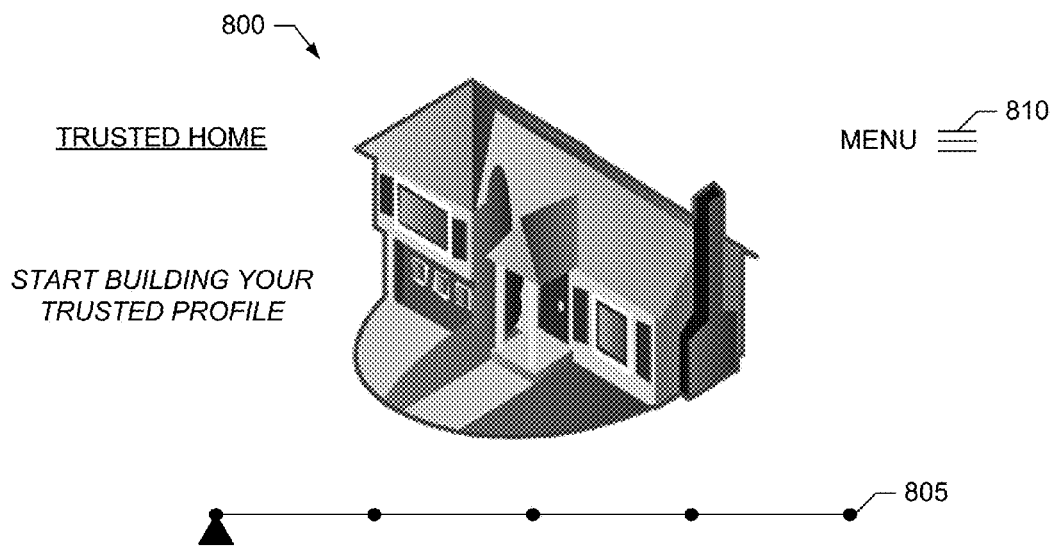
FIGS. 8-12 illustrate example user interfaces implemented by the example centralized identification service of FIGS. 1 and/or 2, and/or the example network access point of FIGS. 1 and/or 4, to register devices in the example centralized authentication system of FIG. 1.

The registration interface of the illustrated example begins with an example home screen 800 illustrated in FIG. 8. The example home screen 800 notifies a user of the device 115A that the profile registration procedure 715 is active, and includes an example progress bar 805 to indicate where the user is in the profile registration procedure 715. The example home screen 800 also includes an example menu 810 to allow a user to navigate to other user interface screens in the profile registration procedure 715.

Figure 9:
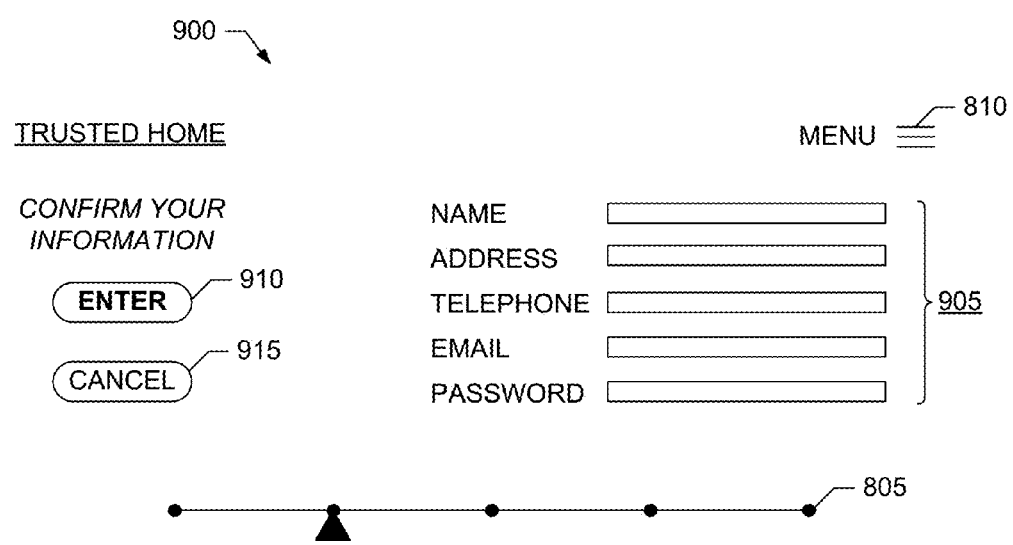

The registration interface of the illustrated example also includes an example user identification screen 900 illustrated in FIG. 9. The example user identification screen 900 permits a user of the device 115A to enter example user identification information 905 to be included in the profile associated with the device 115A. The example user identification information 905 includes, but is not limited to, name and address information for the user, a telephone number for the user, an email address for the user, etc., or any combination thereof. The user identification information 905 may also include a password to be entered to permit updates to be made to the profile associated with the device 115A. The example user identification screen 900 also includes an example enter button 910 and an example cancel button 915 to allow the user to confirm entry of the user identification information 905.

Figure 10:
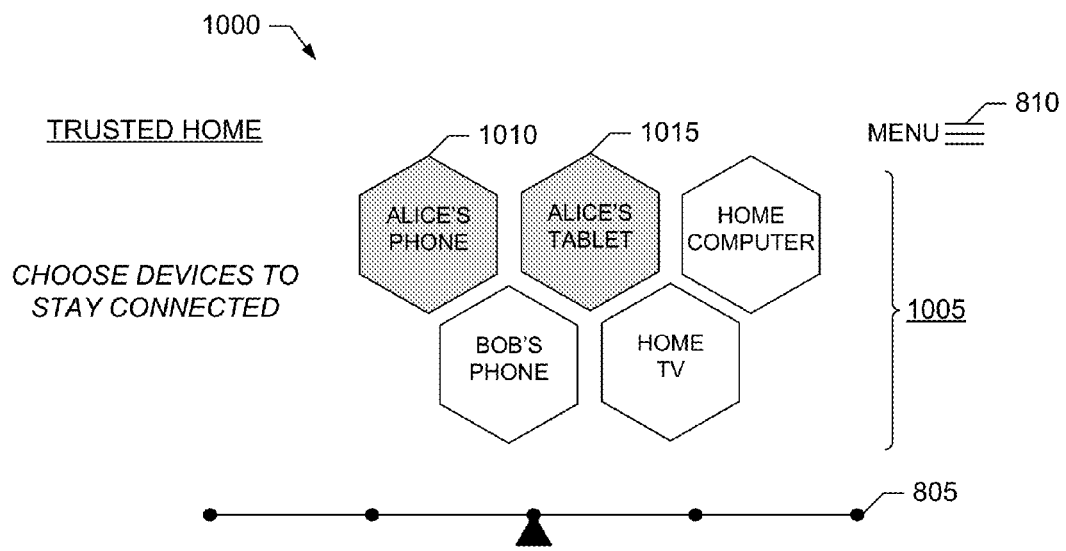
Figure 11:
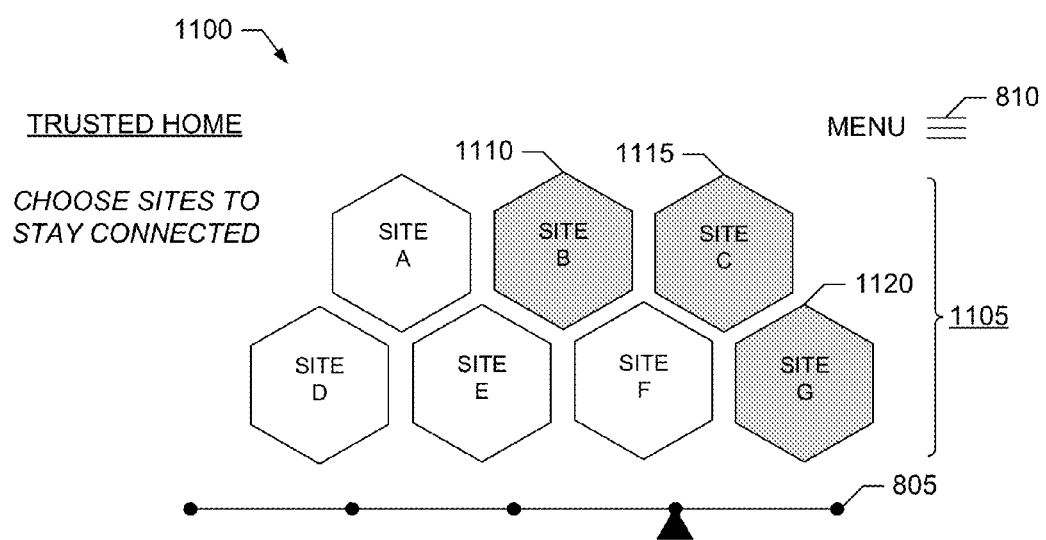
Figure 12:
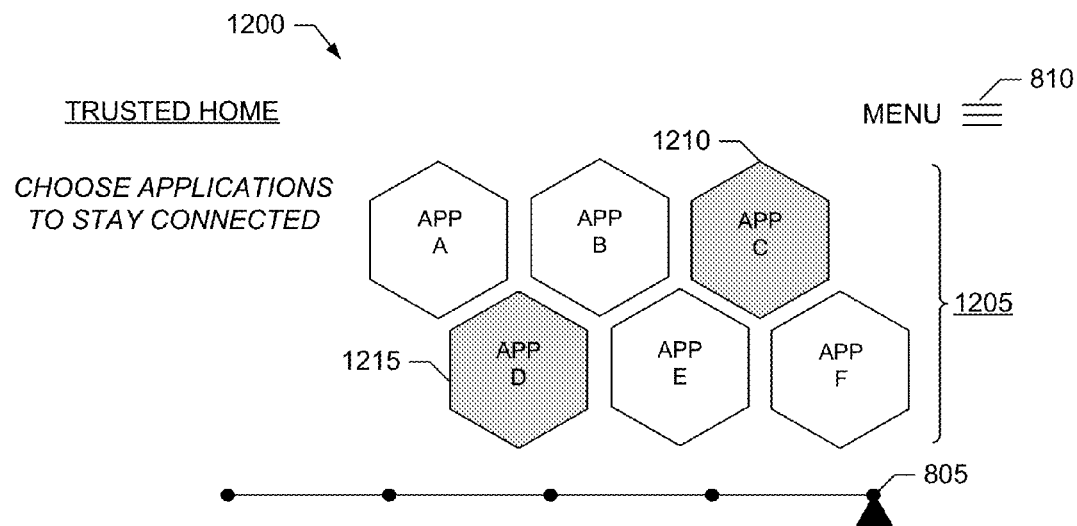

The registration interface of the illustrated example further includes an example device identification screen 1000 illustrated in FIG. 10. The example device identification screen 1000 permits a user of the device 115A to indicate which device(s) is(are) to be registered with the centralized identification service 105 and, thus, for which device(s) profile(s) is(are) to be created. In the illustrated example of FIG. 10, the device identification screen 1000 permits a user to register multiple devices at the same time, which causes the centralized identification service 105 to create profiles for each of the selected devices using the information entered via the profile registration procedure 715. In some examples, if multiple devices are registered at the same time, the centralized identification service 105 links these devices together for use in determining whether devices are co-located with each other, as described above. For example, the device identification screen 1000 presents an example set of devices 1005 that, for example, have been previously detected by a network access point (e.g., such as the network access point 125 and/or 130), and the user may select to register a phone and a tablet by selecting the example icons 1010 and 1015, as shown in FIG. 10. In the illustrated example of FIG. 10, centralized identification service 105 determines mobility information for the devices being registered based on the type of device indicated in the device identification screen 1000. For example, the centralized identification service 105 may automatically determine that devices such as phones, tablets, etc., are mobile, whereas devices such as desktop computers, televisions (TVs), etc., are not mobile (e.g., fixed).

In some examples, the profile registration procedure 715 permits a user to specify which online services are permitted to access authentication information determined by the centralized identification service 105 for the registered device(s). Online services may take the form of, for example, websites that are accessible via a web browser or other general-purpose Internet client implemented by the registered device(s), applications (e.g., apps) resident on the registered device(s) and configured to communicate with one or more servers and/or cloud services implementing the respective service(s), etc. Accordingly, the registration interface of the illustrated example further includes an example site registration screen 1100 illustrated in FIG. 11, and an example application registration screen 1200 illustrated in FIG. 12. The example site registration screen 1100 presents an example set of sites 1105 providing online services supporting centralized authentication. The user may then select which sites, such as the example sites 1110, 1115 and 1120, are permitted to access the centralized authentication information for the registered device(s). Similarly, the example application registration screen 1200 presents an example set of applications 1205 providing online services supporting centralized authentication. The user may then select which applications, such as the example applications 1210 and 1215, are permitted to access the centralized authentication information for the registered device(s). In the illustrated examples, the non-selected sites and/or applications will not be permitted to access the centralized authentication information for the registered device(s).

While example manners of implementing the centralized authentication system 100 are illustrated in FIGS. 1-12, one or more of the elements, processes and/or devices illustrated in FIGS. 1-12 may be combined, divided, re-arranged, omitted, eliminated and/or implemented in any other way. Further, the example centralized identification service 105, the example online services 110 and/or 110A-F, the example devices 115A-F, the example network 120, the example network access points 125 and/or 130, the example network interface 205, the example message processor 210, the example profile storage 215, the example activity storage 220, the example user storage 225, the example profile manager 230, the example identification code manager 235, the example authorizer 240, the example authenticator 245, the example network interface 305, the example access request decoder 310, the example authentication information requester 315, the example authorization requestor 320, the example access controller 325, the example network interface 405, the example device interface 410, the example device registrar 415, the example access request interceptor 420, the example identification code requester 425, the example access request modifier 430 and/or, more generally, the example centralized authentication system 100 of FIGS. 1-4 may be implemented by hardware, software, firmware and/or any combination of hardware, software and/or firmware. Thus, for example, any of the example centralized identification service 105, the example online services 110 and/or 110A-F, the example devices 115A-F, the example network 120, the example network access points 125 and/or 130, the example network interface 205, the example message processor 210, the example profile storage 215, the example activity storage 220, the example user storage 225, the example profile manager 230, the example identification code manager 235, the example authorizer 240, the example authenticator 245, the example network interface 305, the example access request decoder 310, the example authentication information requester 315, the example authorization requestor 320, the example access controller 325, the example network interface 405, the example device interface 410, the example device registrar 415, the example access request interceptor 420, the example identification code requester 425, the example access request modifier 430 and/or, more generally, the example centralized authentication system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example centralized authentication system 100, the example centralized identification service 105, the example online services 110 and/or 110A-F, the example devices 115A-F, the example network 120, the example network access points 125 and/or 130, the example network interface 205, the example message processor 210, the example profile storage 215, the example activity storage 220, the example user storage 225, the example profile manager 230, the example identification code manager 235, the example authorizer 240, the example authenticator 245, the example network interface 305, the example access request decoder 310, the example authentication information requester 315, the example authorization requestor 320, the example access controller 325, the example network interface 405, the example device interface 410, the example device registrar 415, the example access request interceptor 420, the example identification code requester 425 and/or the example access request modifier 430 is/are hereby expressly defined to include a tangible computer readable storage device or storage disk such as a memory, a digital versatile disk (DVD), a compact disk (CD), a Blu-ray disk, etc. storing the software and/or firmware. Further still, the example centralized authentication system 100 may include one or more elements, processes and/or devices in addition to, or instead of, those illustrated in FIGS. 1-12, and/or may include more than one of any or all of the illustrated elements, processes and devices.

Flowcharts representative of example machine readable instructions for implementing the example centralized authentication system 100, the example centralized identification service 105, the example online services 110 and/or 110A-F, the example network access points 125 and/or 130, the example network interface 205, the example message processor 210, the example profile storage 215, the example activity storage 220, the example user storage 225, the example profile manager 230, the example identification code manager 235, the example authorizer 240, the example authenticator 245, the example network interface 305, the example access request decoder 310, the example authentication information requester 315, the example authorization requestor 320, the example access controller 325, the example network interface 405, the example device interface 410, the example device registrar 415, the example access request interceptor 420, the example identification code requester 425 and/or the example access request modifier 430 are shown in FIGS. 13-18. In these examples, the machine readable instructions comprise one or more programs for execution by a processor, such as the processors 1912, 2012 and/or 2112 shown in the example processor platforms 1900, 2000 and/or 2100 discussed below in connection with FIGS. 19, 20 and 21. The one or more programs, or portion(s) thereof, may be embodied in software stored on a tangible computer readable storage medium such as a CD-ROM, a floppy disk, a hard drive, a digital versatile disk (DVD), a Blu-ray Disk™, or a memory associated with the processors 1912, 2012 and/or 2112, but the entire program or programs and/or portions thereof could alternatively be executed by a device other than the processors 1912, 2012 and/or 2112, and/or be embodied in firmware or dedicated hardware (e.g., implemented by an ASIC, a PLD, an FPLD, discrete logic, etc.). Further, although the example program(s) is(are) described with reference to the flowcharts illustrated in FIGS. 13-18, many other methods of implementing the example centralized authentication system 100, the example centralized identification service 105, the example online services 110 and/or 110A-F, the example network access points 125 and/or 130, the example network interface 205, the example message processor 210, the example profile storage 215, the example activity storage 220, the example user storage 225, the example profile manager 230, the example identification code manager 235, the example authorizer 240, the example authenticator 245, the example network interface 305, the example access request decoder 310, the example authentication information requester 315, the example authorization requestor 320, the example access controller 325, the example network interface 405, the example device interface 410, the example device registrar 415, the example access request interceptor 420, the example identification code requester 425 and/or the example access request modifier 430 may alternatively be used. For example, with reference to the flowcharts illustrated in FIGS. 13-18, the order of execution of the blocks may be changed, and/or some of the blocks described may be changed, eliminated, combined and/or subdivided into multiple blocks.

As mentioned above, the example processes of FIGS. 13-18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 13-18 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Also, as used herein, the terms "computer readable" and "machine readable" are considered equivalent unless indicated otherwise.

A first example program 1300 that may be executed to implement the example network access point 125 and/or the example network access point 130 of FIGS. 1 and/or 4 is represented by the flowchart shown in FIG. 13. For convenience and without loss of generality, execution of the example program 1300 is described from the perspective of the program 1300 being executed by the example network access point 125 of FIG. 4 operating in the example centralized authentication system 100 of FIG. 1. With reference to the preceding figures and associated written descriptions, the example program 1300 of FIG. 13 begins execution at block 1305 at which the example device registrar 415 of the network access point 125 detects a message, such as the message 705, received from a device, such as the device 115A. At block 1310, the device registrar 415 determines whether the device corresponding to the message detected at block 1305 is already registered with the centralized identification service 105 (e.g., by consulting an access history maintained in the network access point 125, as described above). If the device is not registered (block 1310), at block 1315 the device registrar 415 sends a REGISTRATION REQUEST message, such as the REGISTRATION REQUEST message 710, to the centralized identification service 105 to cause the centralized identification service 105 to perform a registration procedure with the device, as described above.

A first example program 1400 that may be executed to implement the example centralized identification service 105 of FIGS. 1 and/or 2 is represented by the flowchart shown in FIG. 14. For convenience and without loss of generality, execution of the example program 1400 is described from the perspective of the program 1400 being executed by the example centralized identification service 105 of FIG. 2 operating in the example centralized authentication system 100 of FIG. 1. With reference to the preceding figures and associated written descriptions, the example program 1400 of FIG. 14 begins execution at block 1405 at which the example profile manager 230 of the centralized identification service 105 receives a REGISTRATION REQUEST message, such as the REGISTRATION REQUEST message 710, from a network access point, such as the network access point 125 and/or 130. At block 1410, the profile manager 230 performs a profile registration procedure, such as the profile registration procedure 715, with the device identified in the received REGISTRATION REQUEST message to register the device with the centralized identification service 105 and create a profile for the device, as described above.

Figure 15:
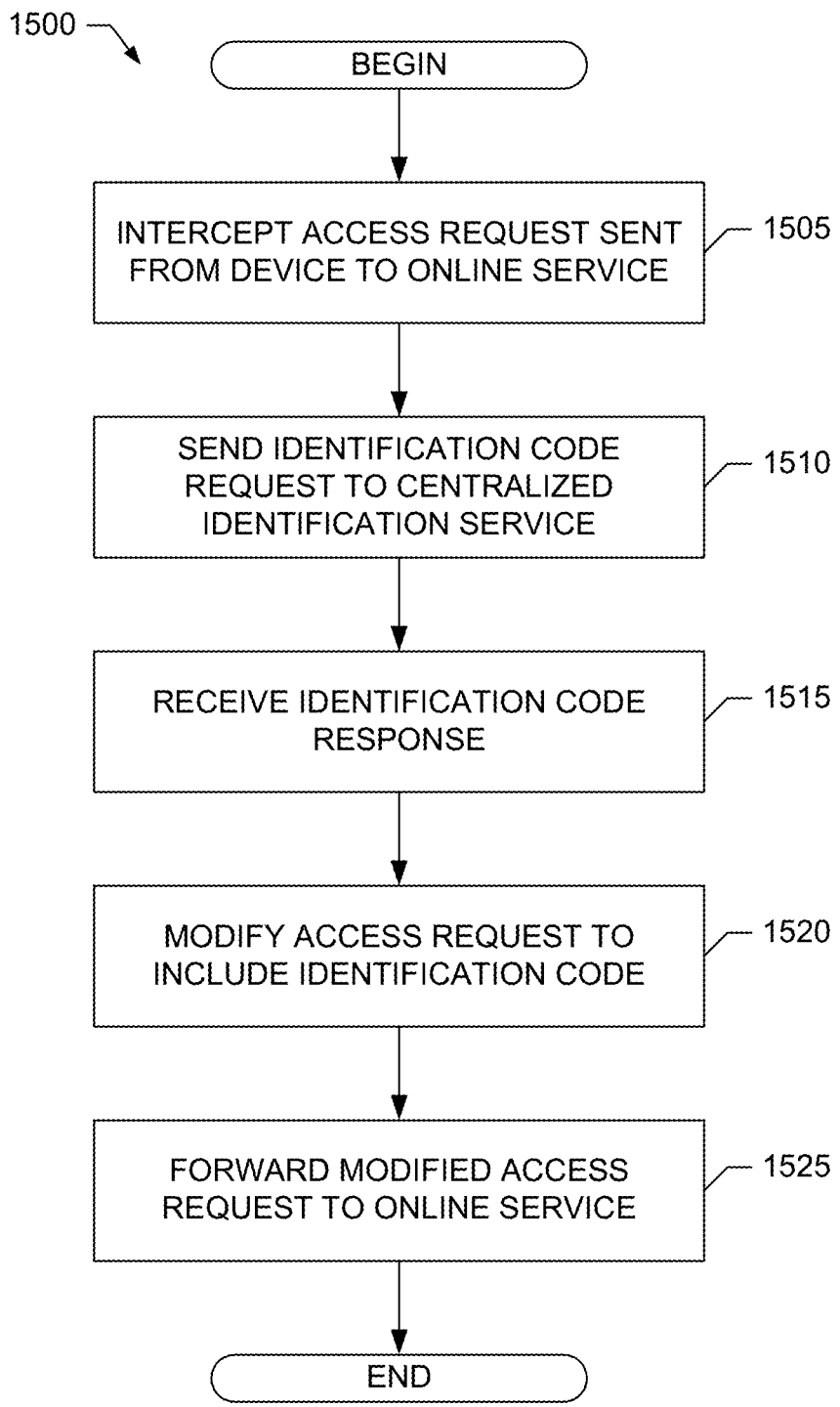
FIG. 15 is a flowchart representative of second example machine readable instructions that may be executed to implement the example network access point of FIGS. 1 and/or 4.

A second example program 1500 that may be executed to implement the example network access point 125 and/or the example network access point 130 of FIGS. 1 and/or 4 is represented by the flowchart shown in FIG. 15. For convenience and without loss of generality, execution of the example program 1500 is described from the perspective of the program 1500 being executed by the example network access point 125 of FIG. 4 operating in the example centralized authentication system 100. With reference to the preceding figures and associated written descriptions, the example program 1500 of FIG. 15 begins execution at block 1505 at which the example access request interceptor 420 of the network access point 125 intercepts an access request message, such as the ACCESS REQUEST message 505, from a device, such as the device 115A. At block 1510, the example identification code requester 425 of the network access point 125 sends an IDENTIFICATION CODE REQUEST message, such as the IDENTIFICATION CODE REQUEST message 510, to the centralized identification service 105 to request an authentication identification code to associate with the device 115A corresponding to the received ACCESS REQUEST message 505. At block 1515, the identification code requester 425 receives an IDENTIFICATION CODE RESPONSE message, such as the IDENTIFICATION CODE RESPONSE message 515, from the centralized identification service 105, which includes the requested identification code. At block 1520, the example access request modifier 430 of the network access point 125 modifies the intercepted ACCESS REQUEST message 505 to include the received authentication identification code to thereby generate a modified access request message, such as the MODIFIED ACCESS REQUEST message 520. At block 1525, the access request modifier 430 forwards the MODIFIED ACCESS REQUEST message 520 on towards the destination of the original ACCESS REQUEST message 505 received at block 1505.

Figure 16:
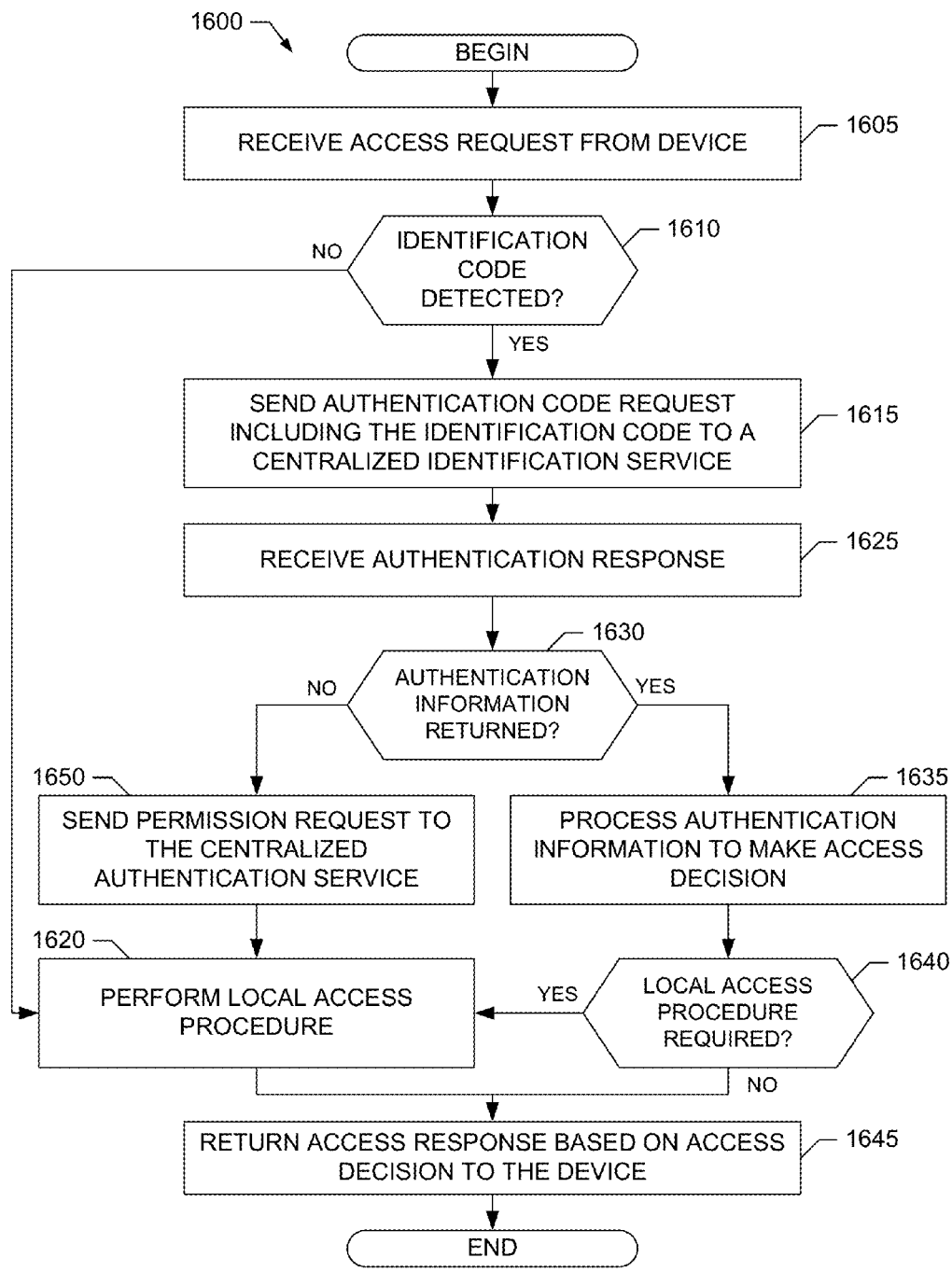
FIG. 16 is a flowchart representative of example machine readable instructions that may be executed to implement the example online service of FIGS. 1 and/or 3.

An example program 1600 that may be executed to implement one or more of the example online services 110 and/or 110A-F of FIGS. 1 and/or 3 is represented by the flowchart shown in FIG. 16. For convenience and without loss of generality, execution of the example program 1600 is described from the perspective of the program 1600 being executed by the example online service 110 of FIG. 3 operating in the example centralized authentication system 100 of FIG. 1. With reference to the preceding figures and associated written descriptions, the example program 1600 of FIG. 16 begins execution at block 1605 at which the example access request decoder 310 of the online service 110 receives an access request message originated by a device, such as the device 115A. At block 1610, the access request decoder 310 detects whether the access request message received at block 1605 includes an authentication identification code (e.g., corresponding to the MODIFIED ACCESS REQUEST message 520 described above). If an identification code is detected (block 1610), control proceeds to block 1615. Otherwise, control proceeds to block 1620.

Assuming that the device 115A originated the access request message received at block 1605, at block 1615 the example authentication information requester 315 of the online service 110 sends an AUTHENTICATION REQUEST message, such as the AUTHENTICATION REQUEST message 525, including the detected identification code to the centralized identification service 105 to request authentication information for the device 115A. At block 1625, the authentication information requester 315 receives an AUTHENTICATION RESPONSE message, such as the AUTHENTICATION RESPONSE message 530 from the centralized identification service 105 in response to the message sent at block 1615. At block 1630, the authentication information requester 315 determines whether the AUTHENTICATION RESPONSE message 530 includes the requested authentication information for the device 115A. If the AUTHENTICATION RESPONSE message 530 includes the requested authentication information (block 1630), at block 1635 the example access controller 325 of the online service 110 processes the authentication information to determine whether to grant access to the device 115A.

At block 1640, the access controller 325 determines whether a local access procedure is required to determine whether to grant access to the device 115A. For example, a local access procedure may be required when the authentication information processed at block 1635 includes a yellow (e.g., intermediate) level of trust for the device 115A, and may not be required when the authentication information processed at block 1635 includes a green (e.g., highest) or red (e.g., lowest) level of trust for the device 115A. If a local access procedure is required (block 1640), control proceeds to block 1620. Otherwise, control proceeds to block 1645 at which the access controller 325 indicates an access decision, such as via the ACCESS DECISION message 545, to the device 115A based on the centralized authentication information processed at block 1635.

Returning to block 1630, if the AUTHENTICATION RESPONSE message 530 does not include the requested authentication information (block 1630), at block 1650 the example authorization requestor 320 of the online service 110 sends a PERMISSION REQUEST message, such as the PERMISSION REQUEST message 615, to the centralized identification service 105 to request permission to access the centralized authentication information for the device 115A. At block 1620, the access controller 325 performs a local access procedure, such as the local access procedure 610, to determine local authentication information for the device 115A. For example, the local access procedure 610 may involves sending the ACCESS PROMPT message 550 to the device 115A and receiving the corresponding ACCESS RESPONSE message 555 from the device 115A, which are described above. Then, at block 1645 the access controller 325 indicates an access decision, such as via the ACCESS DECISION message 545, to the device 115A based on the local authentication information obtained at block 1620 alone or in combination with centralized authentication information processed at block 1635, as appropriate.

Figure 17:
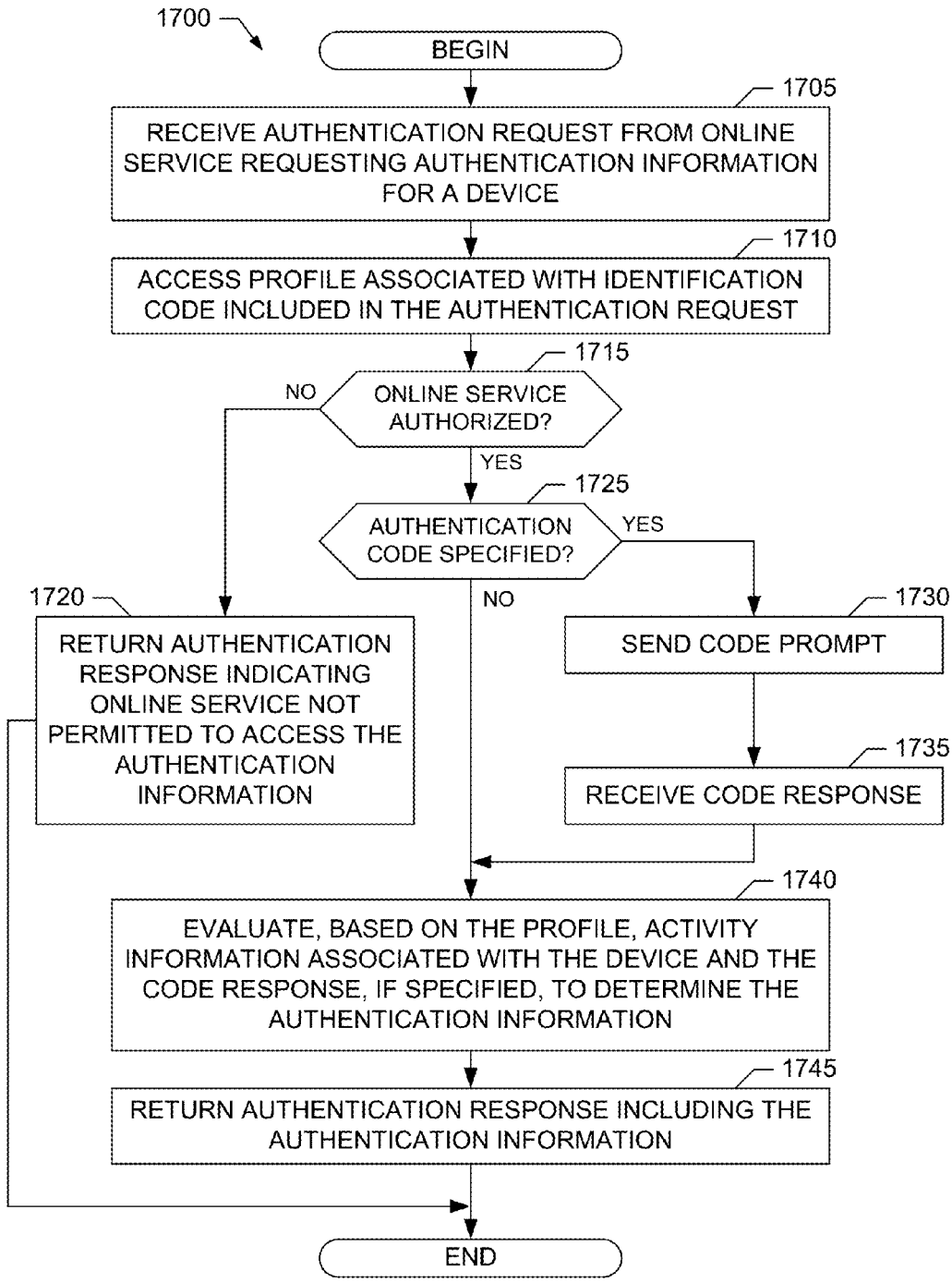
FIG. 17 is a flowchart representative of second example machine readable instructions that may be executed to implement the example centralized identification service of FIGS. 1 and/or 2.

A second example program 1700 that may be executed to implement the example centralized identification service 105 of FIGS. 1 and/or 2 is represented by the flowchart shown in FIG. 17. For convenience and without loss of generality, execution of the example program 1700 is described from the perspective of the program 1700 being executed by the example centralized identification service 105 of FIG. 2 operating in the example centralized authentication system 100 of FIG. 1. With reference to the preceding figures and associated written descriptions, the example program 1700 of FIG. 17 begins execution at block 1705 at which the example authorizer 240 of the centralized identification service 105 receives an AUTHENTICATION REQUEST message, such as the AUTHENTICATION REQUEST message 525, from an online service, such as the online service 110A, which includes an identification code previously assigned by the centralized identification service 105 to temporarily identify the device, such as the device 115A, originating the access request. At block 1710, the authorizer 240 accesses the profile associated with the identification code (assuming the identification code is valid) and, thus, which is associated with the device, such as the device 115A, originating the access request. (If at block 1710 the authorizer 240 determines the identification code is invalid, such as expired or not matching any active identification code, the example program 1700 ends and an AUTHENTICATION RESPONSE message indicating the request for authentication information was invalid is returned to the online service, such as the online service 110A.)

Assuming the online service 110A sent the AUTHENTICATION REQUEST message 525 received at block 1705, and the identification code identifies the device 115A, at block 1715 the authorizer 240 processes the profile for device 115A to determine whether the online service 110A is permitted to access the authorization information for the device 115A. If the online service 110A is not permitted to access the authorization information (block 1715), at block 1720 the authorizer 240 returns an AUTHENTICATION RESPONSE message, such as the AUTHENTICATION RESPONSE message 605, which indicates that the online service 110A is not permitted to access the authorization information for the device 115A.

However, if the online service 110A is permitted to access the authorization information (block 1715), at block 1725 the example authenticator 245 of the centralized identification service 105 determines whether the profile for the device 115A specifies an access code to be requested from the device 115A (or a user of the device 115A). If the profile specifies an access code (block 1725), the authenticator 245 sends a CODE PROMPT message, such as the CODE PROMPT message 535, to the device 115A to request the access code and/or other authentication-related information specified in the profile for the device 115. At block 1735, the authenticator 245 receives a CODE RESPONSE message, such as the CODE RESPONSE message 540, from the device 115A, which includes the requested access code and/or other authentication-related information.

At block 1740, the authenticator 245 evaluates, as described above, activity information maintained for the device 115A, and the response information from the CODE RESPONSE message 540, if any, based on the profile for the device 115A to determine authentication information for the device 115A. At block 1745, the authenticator 245 returns an AUTHENTICATION RESPONSE message, such as the AUTHENTICATION RESPONSE message 530, which includes the authentication information for the device 115A.

Figure 18:
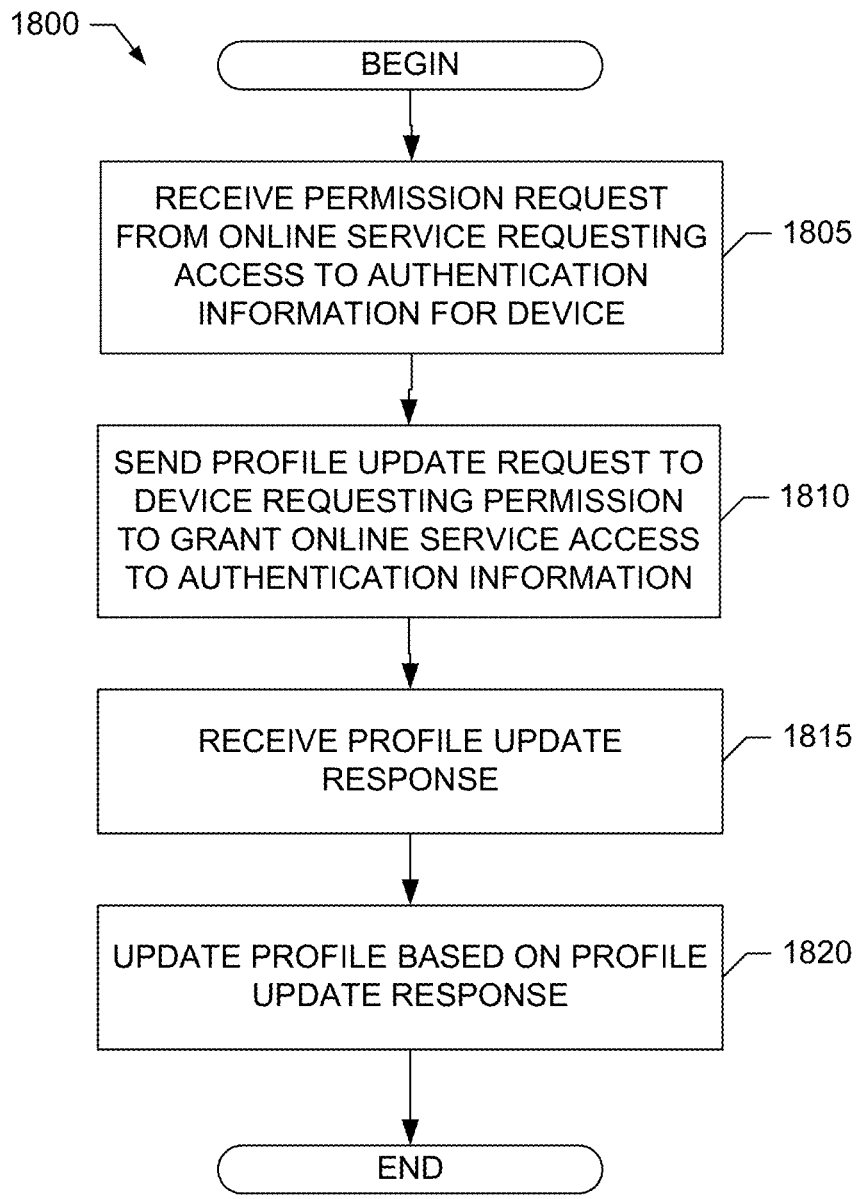
FIG. 18 is a flowchart representative of third example machine readable instructions that may be executed to implement the example centralized identification service of FIGS. 1 and/or 2.

A third example program 1800 that may be executed to implement the example centralized identification service 105 of FIGS. 1 and/or 2 is represented by the flowchart shown in FIG. 18. For convenience and without loss of generality, execution of the example program 1800 is described from the perspective of the program 1800 being executed by the example centralized identification service 105 of FIG. 2 operating in the example centralized authentication system 100 of FIG. 1. With reference to the preceding figures and associated written descriptions, the example program 1800 of FIG. 18 begins execution at block 1805 at which the example authorizer 240 of the centralized identification service 105 receives a PERMISSION REQUEST message, such as the PERMISSION REQUEST message 615, from an online service, such as the online service 110A, which includes an authentication identification code associated with a device, such as the device 115A, for which the online service 110A is not permitted to access centralized authentication information.

Assuming the identification code in the PERMISSION REQUEST message 615 identifies the device 115A, at block 1810 the authorizer 240 sends a PROFILE UPDATE REQUEST message, such as the PROFILE UPDATE REQUEST message 625, to the device 115A to request a user of the device to update the device's profile to indicate whether the online service 110A is permitted to access authentication information for the device 115A. At block 1815, the authorizer 240 receives a PROFILE UPDATE RESPONSE message, such as the PROFILE UPDATE RESPONSE message 630, from the device 115A containing updated profile information. At block 1820, the authorizer 240 updates the profile of the device 115A to grant or deny the online service 110A permission to access the authentication information for the device 115A in accordance with the permission specified in the PROFILE UPDATE RESPONSE message 630.

Figure 19:
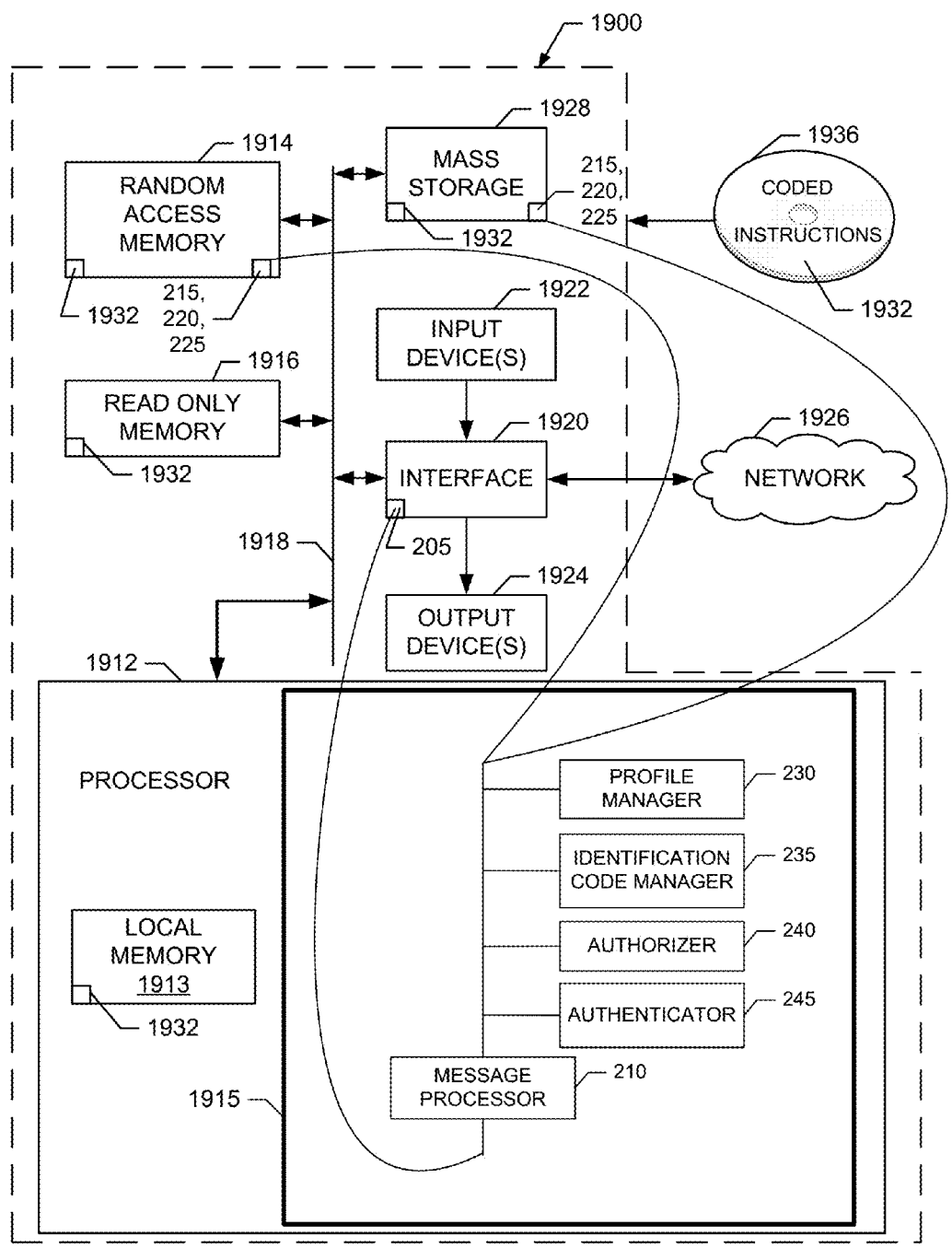
FIG. 19 is a block diagram of an example processor platform structured to execute the example machine readable instructions of FIGS. 14, 17 and/or 18 to implement the example centralized identification service of FIGS. 1 and/or 2.

FIG. 19 is a block diagram of an example processor platform 1900 capable of executing the instructions of FIGS. 14, 17 and/or 18 to implement the example centralized identification service 105 of FIGS. 1 and/or 2. The processor platform 1900 can be, for example, a server, a personal computer, a mobile device (e.g., a cell phone, a smart phone, a tablet such as an iPad™), a personal digital assistant (PDA), an Internet appliance, or any other type of computing device.

The processor platform 1900 of the illustrated example includes a processor 1912. The processor 1912 of the illustrated example is hardware. For example, the processor 1912 can be implemented by one or more integrated circuits, logic circuits, microprocessors or controllers from any desired family or manufacturer. In the illustrated example of FIG. 19, the processor 1912 includes one or more example processing cores 1915 configured via example instructions 1932, which include the example instructions of FIGS. 14, 17 and/or 18, to implement the example message processor 210, the example profile manager 230, the example identification code manager 235, the example authorizer 240 and/or the example authenticator 245 of FIG. 2.

The processor 1912 of the illustrated example includes a local memory 1913 (e.g., a cache). The processor 1912 of the illustrated example is in communication with a main memory including a volatile memory 1914 and a non-volatile memory 1916 via a link 1918. The link 1918 may be implemented by a bus, one or more point-to-point connections, etc., or a combination thereof. The volatile memory 1914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1916 may be implemented by flash memory and/or any other desired type of memory device. Access to the main memory 1914, 1916 is controlled by a memory controller.

The processor platform 1900 of the illustrated example also includes an interface circuit 1920. The interface circuit 1920 may be implemented by any type of interface standard, such as an Ethernet interface, a universal serial bus (USB), and/or a PCI express interface.

In the illustrated example, one or more input devices 1922 are connected to the interface circuit 1920. The input device(s) 1922 permit(s) a user to enter data and commands into the processor 1912. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1900, can allow the user to control the computer system and provide data to the computer using physical gestures, such as, but not limited to, hand or body movements, facial expressions, and face recognition.

One or more output devices 1924 are also connected to the interface circuit 1920 of the illustrated example. The output devices 1924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). In some examples, the interface circuit 1920 of the illustrated example includes a graphics driver card, a graphics driver chip or a graphics driver processor.

The interface circuit 1920 of the illustrated example also includes a communication device such as a transmitter, a receiver, a transceiver, a modem and/or network interface card to facilitate exchange of data with external machines (e.g., computing devices of any kind) via a network 1926 (e.g., an Ethernet connection, a digital subscriber line (DSL), a telephone line, coaxial cable, a cellular telephone system, etc.). In the illustrated example of FIG. 19, the interface circuit 1920 is also structured to implement the example network interface 205.

The processor platform 1900 of the illustrated example also includes one or more mass storage devices 1928 for storing software and/or data. Examples of such mass storage devices 1928 include floppy disk drives, hard drive disks, compact disk drives, Blu-ray disk drives, RAID (redundant array of independent disks) systems, and digital versatile disk (DVD) drives. In some examples, the mass storage device 1930 may implement the example profile storage 215, the example activity storage 220 and/or the example user storage 225. Additionally or alternatively, in some examples the volatile memory 1918 may implement the example profile storage 215, the example activity storage 220 and/or the example user storage 225.

Coded instructions 1932 corresponding to the instructions of FIGS. 14, 17 and/or 18 may be stored in the mass storage device 1928, in the volatile memory 1914, in the non-volatile memory 1916, in the local memory 1913 and/or on a removable tangible computer readable storage medium, such as a CD or DVD 1936.

Figure 20:
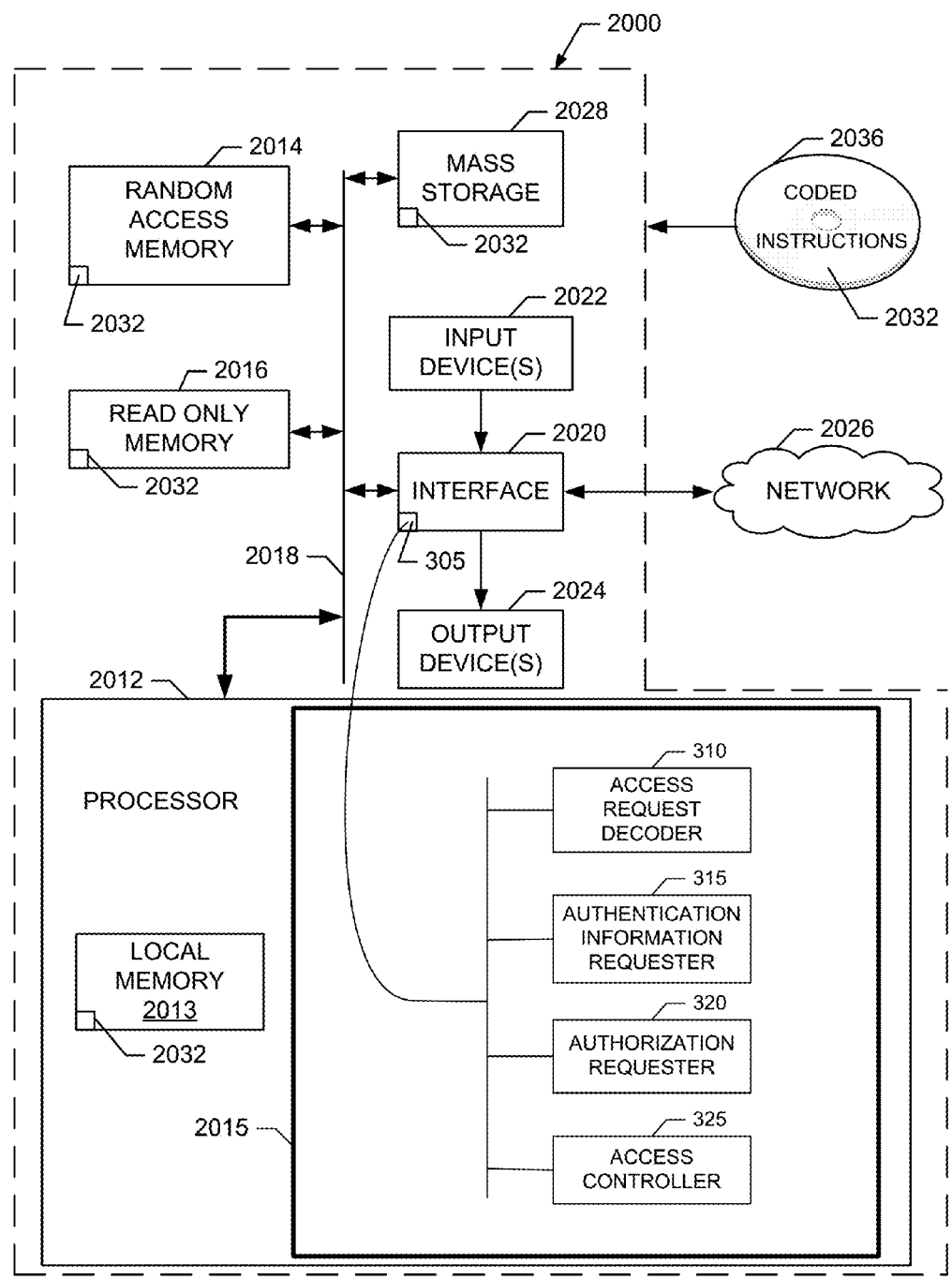
FIG. 20 is a block diagram of an example processor platform structured to execute the example machine readable instructions of FIG. 16 to implement the example online service of FIGS. 1 and/or 3.

FIG. 20 is a block diagram of an example processor platform 2000 capable of executing the instructions of FIG. 16 to implement one or more of the example online services 110 and/or 110A-F of FIGS. 1 and/or 3. The processor platform 2000 can be, for example, a server, a personal computer, a mobile device (e.g., a cell phone, a smart phone, a tablet such as an iPad™), a PDA, an Internet appliance, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer. In the illustrated example of FIG. 20, the processor 2012 includes one or more example processing cores 2015 configured via example instructions 2032, which include the example instructions of FIG. 16, to implement the example access request decoder 310, the example authentication information requester 315, the example authorization requestor 320 and/or the example access controller 325 of FIG. 3.

The processor 2012 of the illustrated example includes a local memory 2013 (e.g., a cache). The processor 2012 of the illustrated example is in communication with a main memory including a volatile memory 2014 and a non-volatile memory 2016 via a link 2018. The link 2018 may be implemented by a bus, one or more point-to-point connections, etc., or a combination thereof. The volatile memory 2014 may be implemented by SDRAM, DRAM, RDRAM and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a USB, and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2000, can allow the user to control the computer system and provide data to the computer using physical gestures, such as, but not limited to, hand or body movements, facial expressions, and face recognition.

One or more output devices 2024 are also connected to the interface circuit 2020 of the illustrated example. The output devices 2024 can be implemented, for example, by display devices (e.g., an LED, an OLED, a liquid crystal display, a CRT, a touchscreen, a tactile output device, a printer and/or speakers). In some examples, the interface circuit 2020 of the illustrated example includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a DSL, a telephone line, coaxial cable, a cellular telephone system, etc.). In the illustrated example of FIG. 20, the interface circuit 2020 is also structured to implement the example network interface 305.

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and DVD drives.

Coded instructions 2032 corresponding to the instructions of FIG. 16 may be stored in the mass storage device 2028, in the volatile memory 2014, in the non-volatile memory 2016, in the local memory 2013 and/or on a removable tangible computer readable storage medium, such as a CD or DVD 2036.

Figure 21:
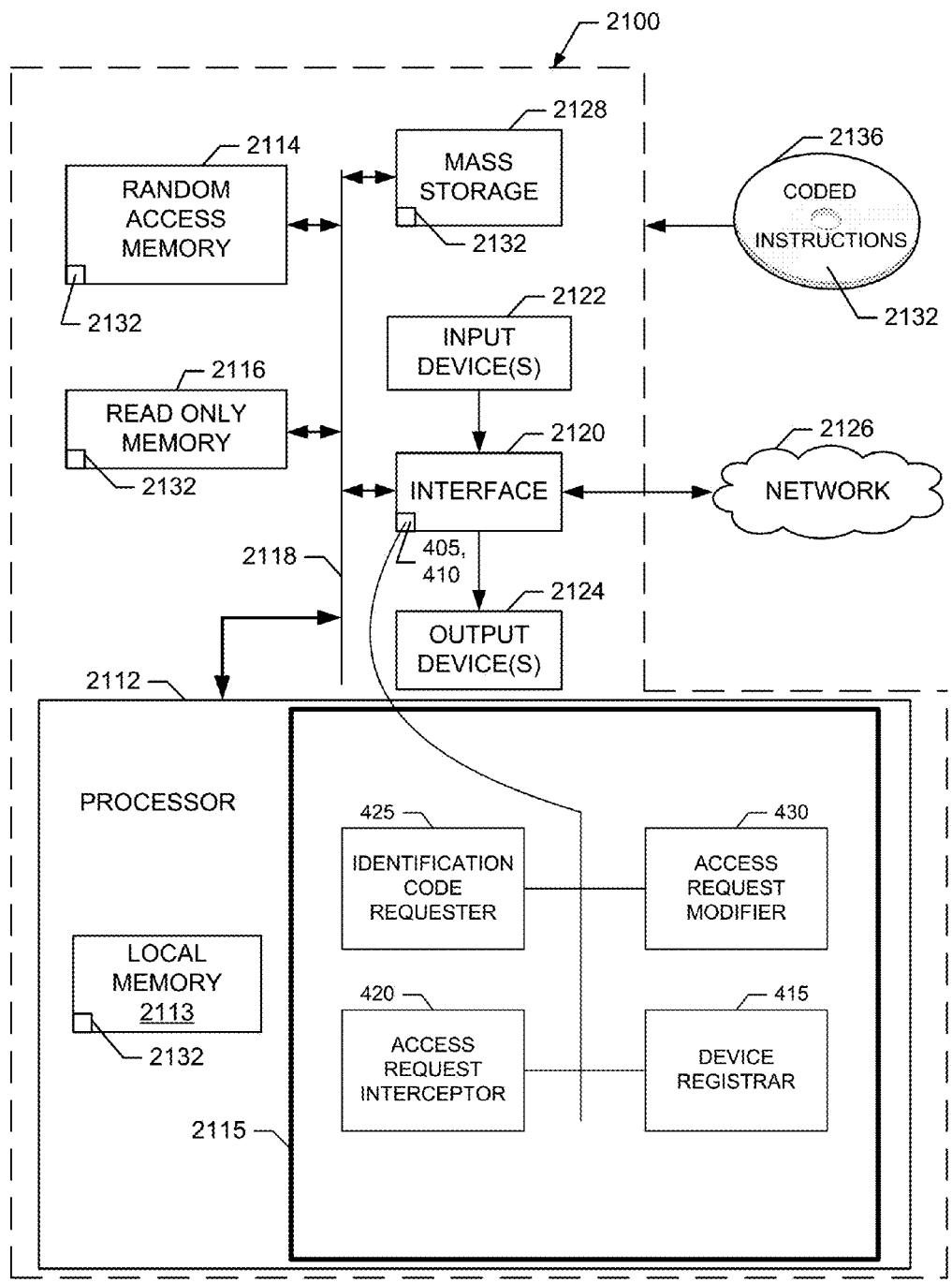
FIG. 21 is a block diagram of an example processor platform structured to execute the example machine readable instructions of FIGS. 13 and/or 15 to implement the example network access point of FIGS. 1 and/or 4.

FIG. 21 is a block diagram of an example processor platform 2100 capable of executing the instructions of FIGS. 13 and/or 15 to implement one or more of the example network access points 125 and/or 130 of FIGS. 1 and/or 4. The processor platform 2100 can be, for example, a server, a personal computer, a mobile device (e.g., a cell phone, a smart phone, a tablet such as an iPad™), a PDA, an Internet appliance, or any other type of computing device.

The processor platform 2100 of the illustrated example includes a processor 2112. The processor 2112 of the illustrated example is hardware. For example, the processor 2112 can be implemented by one or more integrated circuits, logic circuits, microprocessors or controllers from any desired family or manufacturer. In the illustrated example of FIG. 21, the processor 2112 includes one or more example processing cores 2115 configured via example instructions 2132, which include the example instructions of FIGS. 13 and/or 15, to implement the example device registrar 415, the example access request interceptor 420, the example identification code requester 425 and/or the example access request modifier 430 of FIG. 4.

The processor 2112 of the illustrated example includes a local memory 2113 (e.g., a cache). The processor 2112 of the illustrated example is in communication with a main memory including a volatile memory 2114 and a non-volatile memory 2116 via a link 2118. The link 2118 may be implemented by a bus, one or more point-to-point connections, etc., or a combination thereof. The volatile memory 2114 may be implemented by SDRAM, DRAM, RDRAM and/or any other type of random access memory device. The non-volatile memory 2016 may be implemented by flash memory and/or any other desired type of memory device. Access to the main memory 2114, 2116 is controlled by a memory controller.

The processor platform 2100 of the illustrated example also includes an interface circuit 2120. The interface circuit 2120 may be implemented by any type of interface standard, such as an Ethernet interface, a USB, and/or a PCI express interface.

In the illustrated example, one or more input devices 2122 are connected to the interface circuit 2120. The input device(s) 2122 permit(s) a user to enter data and commands into the processor 2112. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 2100, can allow the user to control the computer system and provide data to the computer using physical gestures, such as, but not limited to, hand or body movements, facial expressions, and face recognition.

One or more output devices 2124 are also connected to the interface circuit 2120 of the illustrated example. The output devices 2024 can be implemented, for example, by display devices (e.g., an LED, an OLED, a liquid crystal display, a CRT, a touchscreen, a tactile output device, a printer and/or speakers). In some examples, the interface circuit 2120 of the illustrated example includes a graphics driver card, a graphics driver chip or a graphics driver processor.

The interface circuit 2120 of the illustrated example also includes a communication device such as a transmitter, a receiver, a transceiver, a modem and/or network interface card to facilitate exchange of data with external machines (e.g., computing devices of any kind) via a network 2126 (e.g., an Ethernet connection, a DSL, a telephone line, coaxial cable, a cellular telephone system, etc.). In the illustrated example of FIG. 21, the interface circuit 2120 is also structured to implement the example network interface 405 and/or the example device interface 410.

The processor platform 2100 of the illustrated example also includes one or more mass storage devices 2128 for storing software and/or data. Examples of such mass storage devices 2128 include floppy disk drives, hard drive disks, compact disk drives, Blu-ray disk drives, RAID systems, and DVD drives.

Coded instructions 2132 corresponding to the instructions of FIGS. 13 and/or 15 may be stored in the mass storage device 2128, in the volatile memory 2114, in the non-volatile memory 2116, in the local memory 2113 and/or on a removable tangible computer readable storage medium, such as a CD or DVD 2136.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:

1. An authentication method comprising:
    accessing, with a processor, an identification code included in an authentication request received from an online service for authentication information associated with a first device, the identification code previously assigned to provide valid identification of the first device during a first time interval;
    in response to determining the identification code is valid and a profile selected based on the identification code and associated with the first device permits the online service to access the authentication information, sending an authentication prompt to the device;
    receiving an access code from the device in response to the authentication prompt;
    evaluating the activity information associated with the first device and the access code based on the profile to determine the authentication information; and
    transmitting the authentication information to the online service.

2. The method of claim 1, wherein the evaluating of the activity information further includes:
    accessing mobility information specified for the first device in the profile;
    determining a location of the first device from the activity information;
    providing a first authentication status in the authentication information when the mobility information specifies that the first device is not mobile and the location of the first device corresponds to a location specified in the profile; and
    providing a second authentication status in the authentication information when the mobility information specifies that the first device is not mobile and the location of the first device does not correspond to the location specified in the profile.

3. The method of claim 2, wherein the profile specifies that the first device is associated with a first user, and further including:
    when the mobility information specifies that the first device is mobile, determining, based on the location of the first device, whether the first device is co-located with a second device associated with the first user;
    providing the first authentication status in the authentication information when the mobility information specifies that the first device is mobile and the first device is determined to be co-located with the second device; and
    providing the second authentication status in the authentication information when the mobility information specifies that the first device is mobile and the first device is determined to not be co-located with the second device.

4. The method of claim 2, wherein the first authentication status indicates a higher level of authentication certainty than the second authentication status.

5. The method of claim 1, further including:
    receiving an identification code request from a gateway providing network access to the first device prior to receiving the authentication request from the online service;
    in response to the identification code request, determining the identification code and transmitting the identification code to the gateway; and
    in response to the authentication request, using the identification code to select the profile associated with the first device.

6. The method of claim 1, further including:
    receiving profile information associated with the first device from a gateway providing network access to the first device;
    storing the profile information in the profile associated with the first device; and
    when authorized by the profile information, storing billing information associated with a location of the gateway in the profile associated with the first device.

7. The method of claim 1, further including:
    in response to determining the profile associated with the first device does not permit the online service to access the authentication information, sending an authentication response to the online service indicating the online service is not permitted to access the authentication information;
    after sending the authentication response, receiving a permission request from the online service requesting permission to access the authentication information; and
    in response to the permission request, sending a profile update request to the first device to obtain updated profile information specifying whether the online service is permitted to access the authentication information.

8. A non-transitory computer readable medium comprising computer readable instructions which, when executed, cause a processor to perform operations comprising:

accessing an identification code included in an authentication request received from an online service for authentication information associated with a first device, the identification code previously assigned to provide valid identification of the first device during a first time interval;

in response to determining the identification code is valid and a profile selected based on the identification code and associated with the first device permits the online service to access the authentication information, sending an authentication prompt to the device;

receiving an access code from the device in response to the authentication prompt;

evaluating the activity information associated with the first device and the access code based on the profile to determine the authentication information; and transmitting the authentication information to the online service.

9. The non-transitory computer readable medium of claim 8, wherein the evaluating of the activity information further includes:

accessing mobility information specified for the first device in the profile;

determining a location of the first device from the activity information;

providing a first authentication status in the authentication information when the mobility information specifies that the first device is not mobile and the location of the first device corresponds to a location specified in the profile; and providing a second authentication status in the authentication information when the mobility information specifies that the first device is not mobile and the location of the first device does not correspond to the location specified in the profile.

10. The non-transitory computer readable medium of claim 9, wherein the profile specifies that the first device is associated with a first user, and the operations further include:

when the mobility information specifies that the first device is mobile, determining, based on the location of the first device, whether the first device is co-located with a second device associated with the first user;

providing the first authentication status in the authentication information when the mobility information specifies that the first device is mobile and the first device is determined to be co-located with the second device; and providing the second authentication status in the authentication information when the mobility information specifies that the first device is mobile and the first device is determined to not be co-located with the second device.

11. The non-transitory computer readable medium of claim 8, wherein the operations further include:

receiving an identification code request from a gateway providing network access to the first device prior to receiving the authentication request from the online service;

in response to the identification code request, determining the identification code and transmitting the identification code to the gateway; and in response to the authentication request, using the identification code to select the profile associated with the first device.

12. The non-transitory computer readable medium of claim 8, wherein the operations further include:

in response to determining the profile associated with the first device does not permit the online service to access the authentication information, sending an authentication response to the online service indicating the online service is not permitted to access the authentication information;

after sending the authentication response, receiving a permission request from the online service requesting permission to access the authentication information; and in response to the permission request, sending a profile update request to the first device to obtain updated profile information specifying whether the online service is permitted to access the authentication information.

13. An apparatus to perform authentication, the apparatus comprising:

memory including computer readable instructions; and a processor to execute the instructions to perform operations including:

accessing an identification code included in an authentication request received from an online service for authentication information associated with a first device, the identification code previously assigned to provide valid identification of the first device during a first time interval;

in response to determining the identification code is valid and a profile selected based on the identification code and associated with the first device permits the online service to access the authentication information, sending an authentication prompt to the device;

receiving an access code from the device in response to the authentication prompt;

evaluating the activity information associated with the first device and the access code based on the profile to determine the authentication information, and transmitting the authentication information to the online service.

14. The apparatus of claim 13, wherein the evaluating of the activity information further includes:

accessing mobility information specified for the first device in the profile;

determining a location of the first device from the activity information;

providing a first authentication status in the authentication information when the mobility information specifies that the first device is not mobile and the location of the first device corresponds to a location specified in the profile; and providing a second authentication status in the authentication information when the mobility information specifies that the first device is not mobile and the location of the first device does not correspond to the location specified in the profile.

15. The apparatus of claim 14, wherein the profile specifies that the first device is associated with a first user, and the operations further include:

when the mobility information specifies that the first device is mobile, determining, based on the location of the first device, whether the first device is co-located with a second device associated with the first user;

providing the first authentication status in the authentication information when the mobility information specifies that the first device is mobile and the first device is determined to be co-located with the second device; and providing the second authentication status in the authentication information when the mobility information specifies that the first device is mobile and the first device is determined to not be co-located with the second device.

16. The apparatus of claim 13, wherein the operations further include:

receiving an identification code request from a gateway providing network access to the first device prior to receiving the authentication request from the online service;

in response to the identification code request, determining the identification code and transmitting the identification code to the gateway; and in response to the authentication request, using the identification code to select the profile associated with the first device.

17. The apparatus of claim 13, wherein the operations further include:

in response to determining the profile associated with the first device does not permit the online service to access the authentication information, sending an authentication response to the online service indicating the online service is not permitted to access the authentication information;

after sending the authentication response, receiving a permission request from the online service requesting permission to access the authentication information; and in response to the permission request, sending a profile update request to the first device to obtain updated profile information specifying whether the online service is permitted to access the authentication information.

* * * * *